INVENTORS
Lonnie A. Burnett
Joseph A. Rave, Jr.
Richard E. Read
Norman D. Neal
BY
Howard & Keizer
& Jack J. Earl

| $C_i$ | $A_i$ | Sum. | Diff. | Add $C_{i+1}$ | Sub. $C_{i+1}$ |
|---|---|---|---|---|---|
| 0 | 0 | 0 | 0 | 0 | 0 |
| 0 | 1 | 1 | 1 | 0 | 0 |
| 1 | 0 | 1 | 1 | 0 | 1 |
| 1 | 1 | 0 | 0 | 1 | 0 |

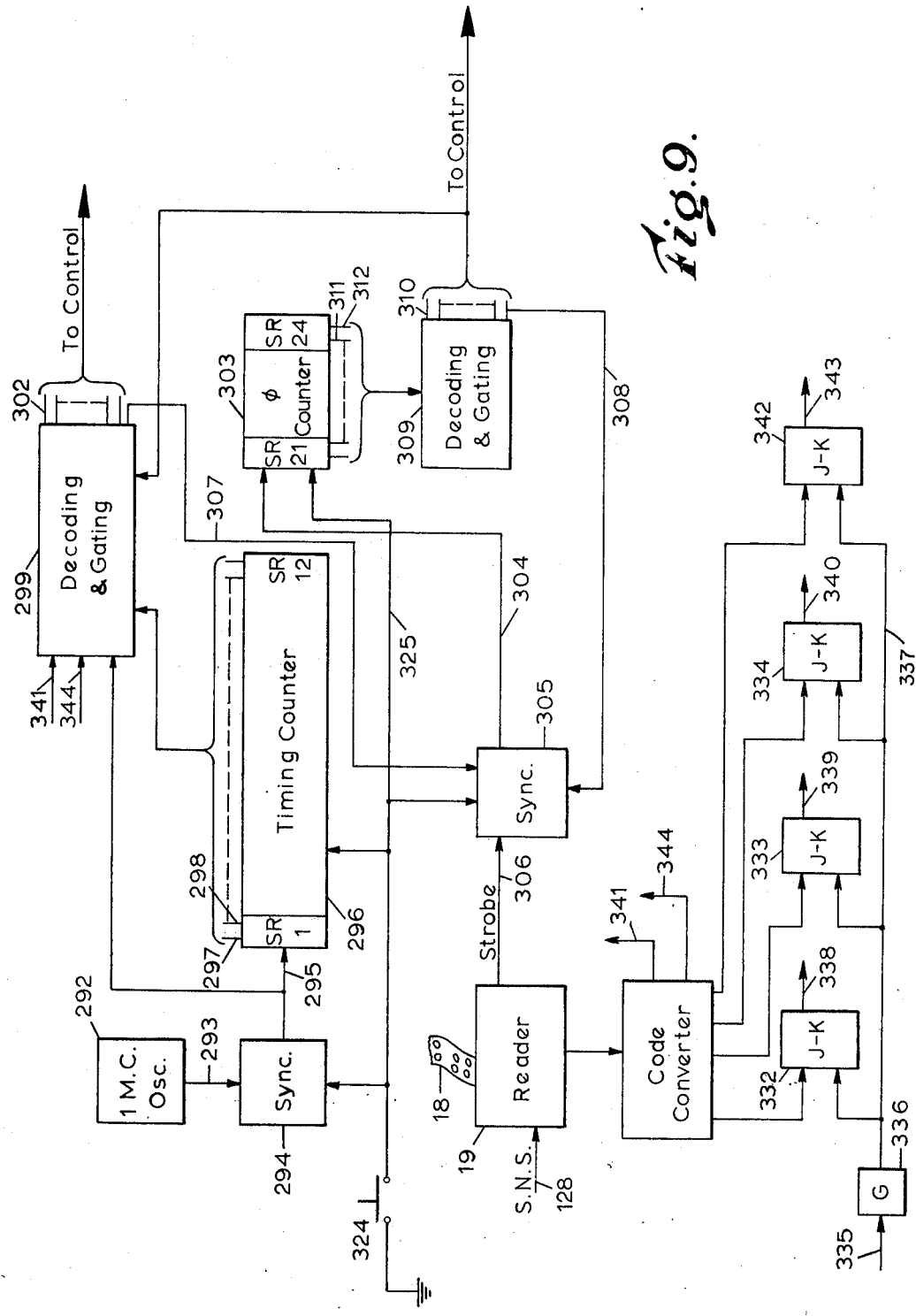

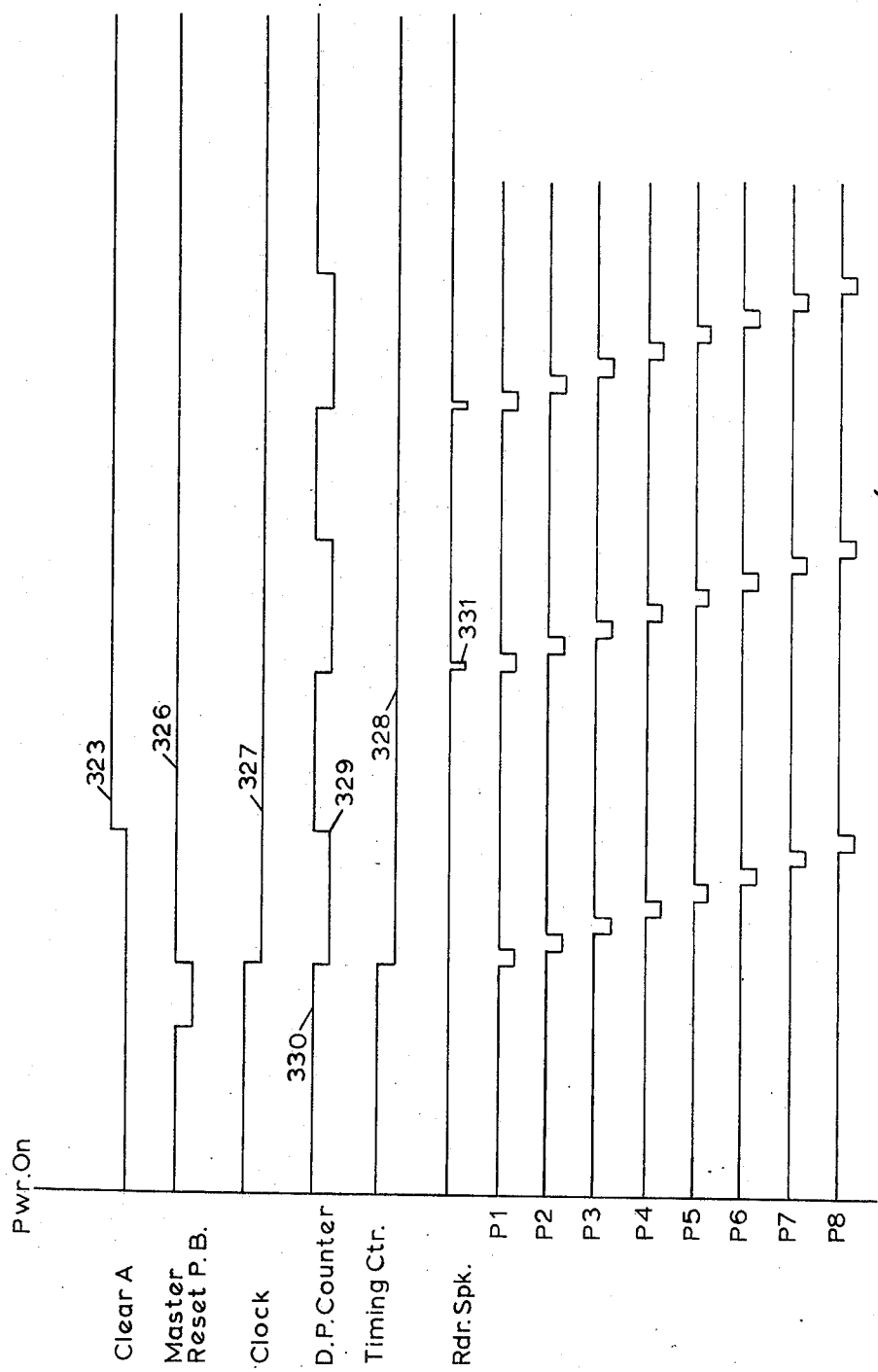

United States Patent Office 3,486,012
Patented Dec. 23, 1969

3,486,012
AUTOMATIC CONTROL APPARATUS
Lonnie A. Burnett, Joseph A. Rave, Jr., Richard E. Read, and Norman D. Neal, Cincinnati, Ohio, assignors to The Cincinnati Milling Machine Co., Cincinnati, Ohio, a corporation of Ohio
Filed Oct. 20, 1965, Ser. No. 498,488
Int. Cl. G06f 15/46, 15/20; G06g 7/48
U.S. Cl. 235—151.11
28 Claims

ABSTRACT OF THE DISCLOSURE

A digitally implemented numerical control system designed to control a plurality of machine elements simultaneously and continuously along a program path. The path is defined dimensionally by its axial components with direct programming of the desired resultant feed rate. The numerical control provides digital acceleration and deceleration between successive spans and produces outputs to the machine elements that cause a simultaneous and continuous motion defining the programmed path and velocity.

---

This invention relates to programmed control mechanisms of the type adapted to control a plurality of elements simultaneously and continuously.

An object of this invention is the provision of a control system in which dimensionally spaced digital input descriptions are employed for the continuous generations of more closely spaced output descriptions of points ranging in value from the preceding to the next succeeding of two successive spaced points located on a predetermined path and represented by successive input descriptions of spaced points therealong.

Another object of this invention is the provision of an automatic control system operated in response to digitally encoded input information but which system provides absolute and unambiguous control over its full range of operation.

A further object of this invention is to provide a control system which combines the speed and accuracy of numerical manipulation afforded in digital systems with the positive and absolute control over a predetermined range that is characteristic of analog systems.

It is also an object of this invention to provide an improved digital interpolation system in which programmed span lengths can vary from one to the next by significant amounts with out affecting the space-time rate of the interpolative generation of points lying along the input spans.

Another object of this invention is the provision of an interpolation system which is automatically adjusted to reduce the range of iteration command rates.

It is a further objective of this invention to provide a unique system for controlling the rate of drive of a digital interpolation process in accordance with varying programmed rates.

Also, it is an objective of this invention to provide a digital interpolation system that responds automatically to control the rate of acceleration or deceleration in an interpolation process in response to change in programmed rates of interoplation.

A still further objective of this invention is the provision of an automatic control system in which a variable is controlled in accordance with an interpolative generation of data representing points along a continuous parameter and in which the rate of generation of these points is conveniently changed by a simple adjustment of a potentiometer.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form the apparatus of this invention includes a tape reader and code conversion unit which furnishes data in the form of pure binary number words that are dimensionally descriptive of spaced points progressing along a continuous parameter, in the example to be described in detail later herein, the parameter is a continuous curve in space and the points are defined as dimensions given with respect to a system of coordinate axes at spaced points along the curve. Each of the dimensions for a point on the curve is compared against the dimensions of the next preceding point to form a set of binary number difference words respectively representing the span lengths along the reference axes between these two points on the curve. These binary difference number words are normalized simultaneously to eliminate the leading zeros (binary words being comprised of only two symbols, "zero" and "one" as is conventional) in the largest of the difference number words. This normalizing is in effect a simultaneous multiplication of each of the difference number words by the number base or radix, a value of two in the binary system, until the largest of these number words has a "one" in the most significant digit place to be considered by the control. The normalizing process changes the modulus of each difference number word and each is changed by the same amount. The modulus of a binary number word can be defined as the number of finite states that the number word can represent, all digits of the word being significant, and the modulus after normalization, as the number of finite states that the significant digits of the binary word can represent, the trailing zeros generated by the normalization process being nonsignificant. The interpolation process follows the normalizing of the difference number words and is accomplished by a circuit which iteratively adds each normalized difference word the modulus number of times and the overflows or carries resulting from the iterative addition circuits are algebraically accumulated to generate a set of new binary number dimension words having values that incrementally progress from the dimensions of the preceding point to the dimensions of the succeeding point on the curve. The accumulation continues through the operation of the system from start to finish and the sign of the difference controls the algebraic accumulation so that, with respect to any of the coordinate axes, the dimensional value can move in one or the other direction with respect to the coordinate origin. The sign of each difference dimension word is dependent upon the direction from the preceding to the succeeding ones of the dimension number words along the respective axis. The accumulated dimensions are periodically sampled as they are generated to provide inputs for a set of digital to analog converters which use the digital information to produce analogue voltage command signals that are input to servo systems. These systems power the desired coordinate motion of movable members such as machine tool slides.

The rate of generation of the accumulated dimensions determines the rate at which the servo mechanisms are caused to operate. The rate of generation is regulated by a rate control circuit which consists of three basic sections: One is a circuit that causes the iterative add rate in the interpolation process to proceed in direct proportion to a programmed rate. The second is a circuit which provides a convenient override system such that the programmed rate can be altered by a change in voltage level of a signal. Since the rate of movement in a system of control for more than one coordinate dimension should desirably take into account the actual resultant movement and not just movement along one axis, the interpolation rate control circuit is further provided with the third circuit that controls the iterative add rate as an inverse function of the length of the resultant path of movement defined by each set of coordinate dimensional differences.

A clear understanding of the construction and operation of this invention can be obtained from the following detailed description in which reference is made to the accompanying drawings wherein:

FIG. 1 is a general block diagram of the overall control system as arranged for control of three movable elements such as the coordinate slides of a machine tool.

FIGS. 2 through 5 and 7 through 9 are detailed block diagrams of functional blocks shown in FIG. 1.

FIGS. 10 and 12 are timing diagrams.

GENERAL

Figure 1:
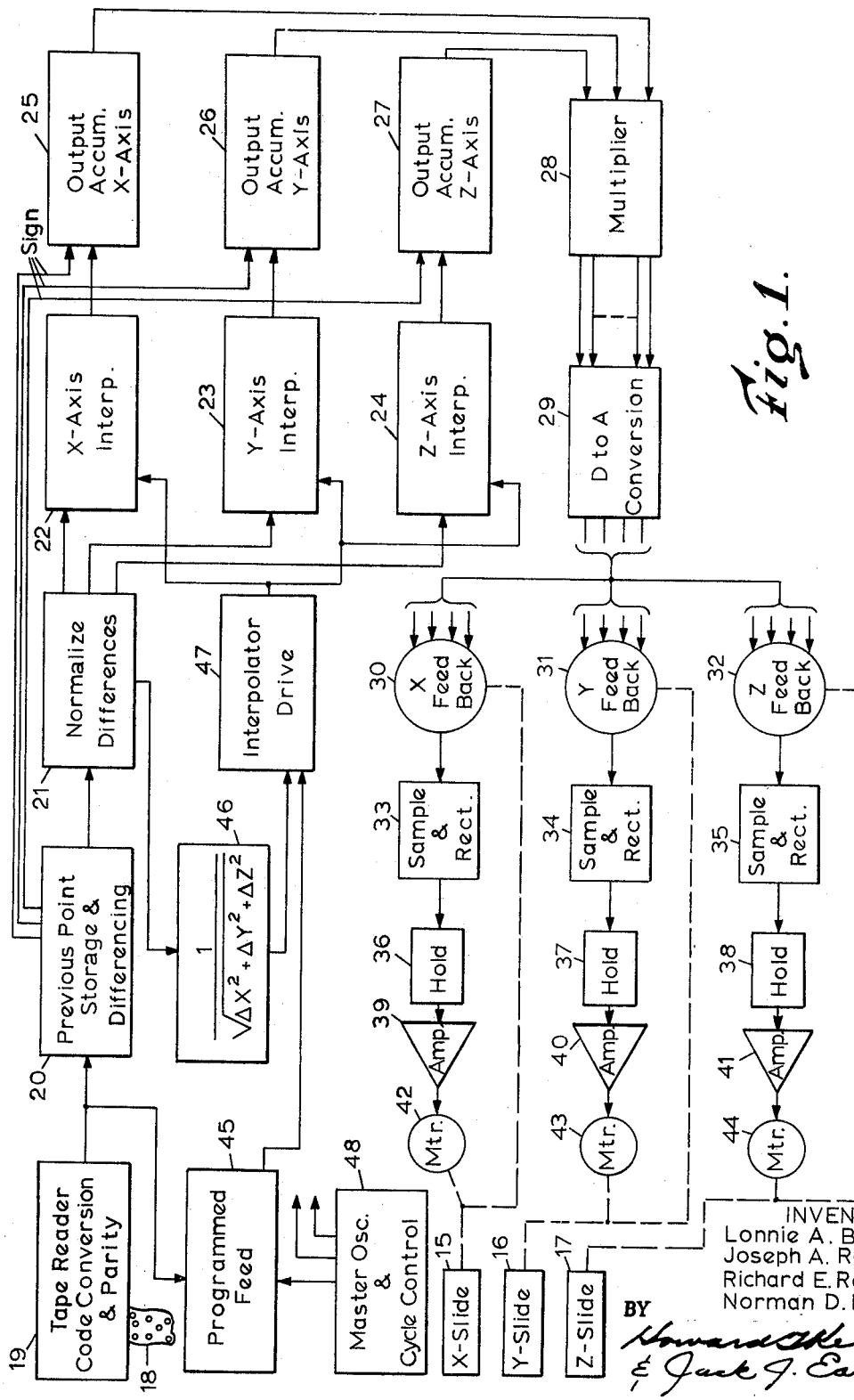

The control apparatus of this invention is shown generally by the block diagram of FIG. 1. It is the purpose of the control to cause simultaneous movement of a set of slides 15, 16, 17 to effect a relative movement that closely approximates movement of a point in space along a predetermined path. A well known use of such coordinated movement is in an automatic milling machine under what is commonly termed "numerical control" to reproduce complex contours on a workpiece. The slides 15, 16 and 17 are identified by their directions of movement, the directions being defined as the X-axis, Y-axis and Z-axis, respectively, in a three axis system of control as is illustrated and will be described in detail herein. The apparatus utilizes data that is recorded in information blocks along a punched tape 18. The tape 18 is conventional eight channel punched tape using a word address scheme of recording in which the block has three dimensions recorded in binary coded decimal form, each dimension being preceded by an axis address to define its direction and to associate it with one of the slides 15, 16, 17. The tape 18 can also have certain auxiliary functions recorded in each block which functions cause various on-off mechanisms to respond, but these will be ignored herein for simplification since the use of this auxiliary function is not involved in the invention herein. Also, a programmed feed rate value can be included in the information blocks. This feed rate value will be considered later herein. Each complete block of information is ended by an end of block symbol to separate and identify the blocks on the tape 18.

The tape 18 is read by a reader circuit 19 which includes a code conversion unit that changes the respective coordinate dimensions and feed rate numbers into a pure binary number word form and these binary number words issue from the reader and code converter section 19 serially, least significant digit first. The reader circuit 19 also includes a parity checking circuit of conventional form which examines the punched data on the tape 18 and compares it against certain standards to determine its validity. If the data is invalid, a signal is produced to interrupt the control and stop the machine. Parity checking circuits are well known in the art and further description herein will not be undertaken.

The binary dimension number words from the reader and code conversion circuit 19 are connected as inputs to a unit 20 which includes storage for the previous point dimensions. The first dimension of a newly read block is compared against the next previous corresponding dimension, for example, the newly read X-axis dimension is compared against the previously read X-axis dimension. A difference signal is generated, also in binary number word form, if a difference exists, and this difference number word is tested to determine its direction along the respective axis of movement from the previous point and a sign, minus or plus, is assigned to it in accordance with the direction toward or away from the origin of the axes. The difference number word is serially shifted out of the differencing circuit 20 to the next circuit unit 21. Also, the newly read dimension is stored in the differencing circuit 20 to be used as the previous point when the next block of information is read from the tape 18.

The three dimensions X, Y, and Z, are serially read from the tape 18 and a difference is formed for each as described. It is possible in the present system to input span length information directly with a sign designation in which case the differencing described would not be required. The balance of the control would function in the same manner in such a case. The three differences, whether computed or programmed, are each shifted to appropriate circuits in the next unit 21 which stores these differences first in the form as they issue from the differencing circuit 20 and then converts these three difference dimensions simultaneously to a normalized form. Each of these is then stored for subsequent use. The normalizing of the difference numbers eliminates the leading "zeros" or those "zeros" in the most significant digit places until the largest difference number has a "one" in its most significant digit place. This is in effect a simultaneous and successive multiplication of the difference number words by their radix, two, until the most significant "zero" in the largest difference number word disappears. The normalizing of the difference numbers changes the modulus of the difference number words. As previously stated, the modulus of a binary number word is the number of finite states that the number word can represent, all digits of the word being significant, and the modulus after normalization, as the number of finite states that the significant digits of the binary word can represent, the trailing zeros generated by the normalization process being nonsignificant.

The normalized difference numbers are then dumped into the next circuit blocks 22 23 and 24, respectively, which perform, simultaneously, an interpolation for each difference dimension. In performing the interpolation, each of the circuits 22, 23, 24 iteratively adds its respective normalized difference number the modulus number of times. As these iterative adds proceed, the sum exceeds the modulus and the excessive digit signals occur as carry or overflow signals which are transmitted to a respective accumulator circuit 25, 26, 27 where they are algebraically combined with the previous accumulation and therefore they continuously generate a dynamic number which proceeds in absolute value from the point previously read from the tape 18 to the next succeeding point, that is, from one to the other of the two points from which the difference number word was obtained in the differencing circuit 20. The respective sign signals from the difference circuit 20 are connected to the accumulator circuits 25, 26, 27 to set these circuits to add or subtract the overflows to or from the previous accumulation, respectively, in accordance with the direction of the difference over which interpolation is proceeding.

Certain digits of the accumulated numbers, stored in the accumulators 25, 26, 27 in binary form, are periodically and cyclicly connected to a multiplier circuit 28 which multiplies the sampled portions by a fixed factor to make the sampled portion of the accumulated number cyclic over a fixed range compatible with the analog portion of the control. The number of bits of the accumulators 25, 26, 27 to be sampled is fixed and therefore the value of the sampled accumulation cycles periodically. For example, the accumulators may be sampled only at their ten bits of least significance and in a binary system this means the number sampled will be cyclic over each 1024 overflows. If each bit is weighted at 0.0002 inch per bit, the corresponding travel of a slide is 0.2048 inch. Hardware for the fine control in the analog system is most conveniently obtained for use in a system that is cyclic over 0.200 inch. Therefore a fixed multiplier value of 1.024 is used in the multiplier circuit 28 to render the ten bits sampled cyclic over 0.200 inch.

The output of the multiplier circuit 28 is connected to a digital to analog converting circuit 29 which converts the binary information to a voltage analog signal that is impressed on an alternating signal carrier. This signal is connected to energize the quadrature stator windings in each of a set of resolver type feedback units 30, 31 and 32 of the three axis servo loops. It should be pointed out that the feedback units are multispeed systems that provide an unambigious control over the full range of movements of the respective slides. The system is for continuous or contour type control and the lag of the instantaneous slide position behind the input command signal is normally much less than the cyclic portion of the finest or most accurate of the position analog signals. Therefore, in normal operation after alignment, only the fine range portion is used and in the specific case, this is the 0.200 inch range resolver to which reference has previously been made. The output accumulator does, however, maintain an absolute value over the full range which is connectable to the multi-speed position analog units 30, 31, 32 in an alignment mode of the machine.

A set of sample and rectification circuits 33, 34 and 35 is provided and each of these is connected to the output of its corresponding feedback unit 30, 31 and 32. These sampling circuits 33, 34, 35 are operated periodically and cyclicly in time with the connection of the output accumulators 25, 26, 27 to the multiplier circuit 28 to connect the alternating signal from the feedback units 30, 31, 32 to direct current voltage level holding circuits 36, 37 and 38, respectively. The circuits 36, 37, 38 store the sampled and rectified voltage level from one sampling period to the next for the respective axes. Each of the holding circuits 36, 37, 38 is connected to furnish its stored voltage level signal to a power amplifier 39, 40, 41, respectively, which provide the input drive to motors 42, 43, 44. The motors 42, 43, 44 can, for example, be hydraulic motors and it is understood that the motor blocks in FIG. 1 include the conventional electro-hydraulic transducers which cause operation of the motors to drive the respective slides 15, 16, 17 to which they are mechanically connected. The motors 42, 43, 44 are also mechanically linked to the feedback units 30, 31, 32 to close the respective servo loops and the amplified signal outputs from the amplifiers 39, 40, 41 are applied to the motors 42, 43, 44 in such a manner as to cause the feedback units 30, 31, 32 to be driven in a direction tending to reduce the error signal output as sampled and stored in the hold circuits 36, 37, 38.

The rate of operation of each of the motors 42, 43, 44 is dependent upon the amplitude of the error signal as applied to its respective hold circuits 36, 37, 38. This amplitude is directly proportional to the dimension word change in its particular accumulator 25, 26, 27 in the interval between successive sampling periods. This change in the dimension word is in turn directly proportional to the rate of accumulation of overflow signals, or more specifically, to the iterative add rate at which the interpolators 22, 23, 24 are operated. Therefore by controlling the rate of interpolation, the rate of movement of the slides 15, 16, 17 and the corresponding rate of generation of the predetermined path in space is controlled.

As previously mentioned, the blocks of information on the tape 18 can include a programmed feed rate. This feed rate is converted in the reader circuitry to a binary number word which is conveyed to a programmed feed rate control circuit 45 and this circuit produces a series of output gating signals that are directly proportional in frequency to the programmed feed rate. (The circuit 45 also includes provision for an override control of the feed rate that proportionally adjusts the result of the programmed feed rate. This will be described in detail later herein.) In a three axis system the feed rate control is of the actual or resultant movement of the point through space and therefore a computer circuit 46 is provided wherein a numerical value is produced, the magnitude of which varies in accordance with the reciprocal of an approximation of the vector sum of the span lengths in the respective coordinate directions over which interpolation is performed. That is, the numerical value from the circuit 46 is inversely proportional to the square root of the sum of the squared span lengths represented by the separate difference numbers. This numerical value is used to modify the gating signals from the circuit 45 in an interpolator drive circuit 47 from which discrete blocks of pulses issue at a rate of repetition that is a function of the modified gating signals. Each discrete block of interpolator drive pulses produces one serial addition in each the interpolators 22, 23, 24.

The block diagram of FIG. 1 also includes a master oscillator and cycle control circuit 48 by which the elements throughout the entire control apparatus are driven and maintained in properly timed relationship with each other. The timing relationships will become apparent in the ensuing detailed descriptions of the various circuits which have thus far been shown only in their most elementary functional block form.

PREVIOUS POINT STORAGE AND DIFFERENCING

Figure 2:
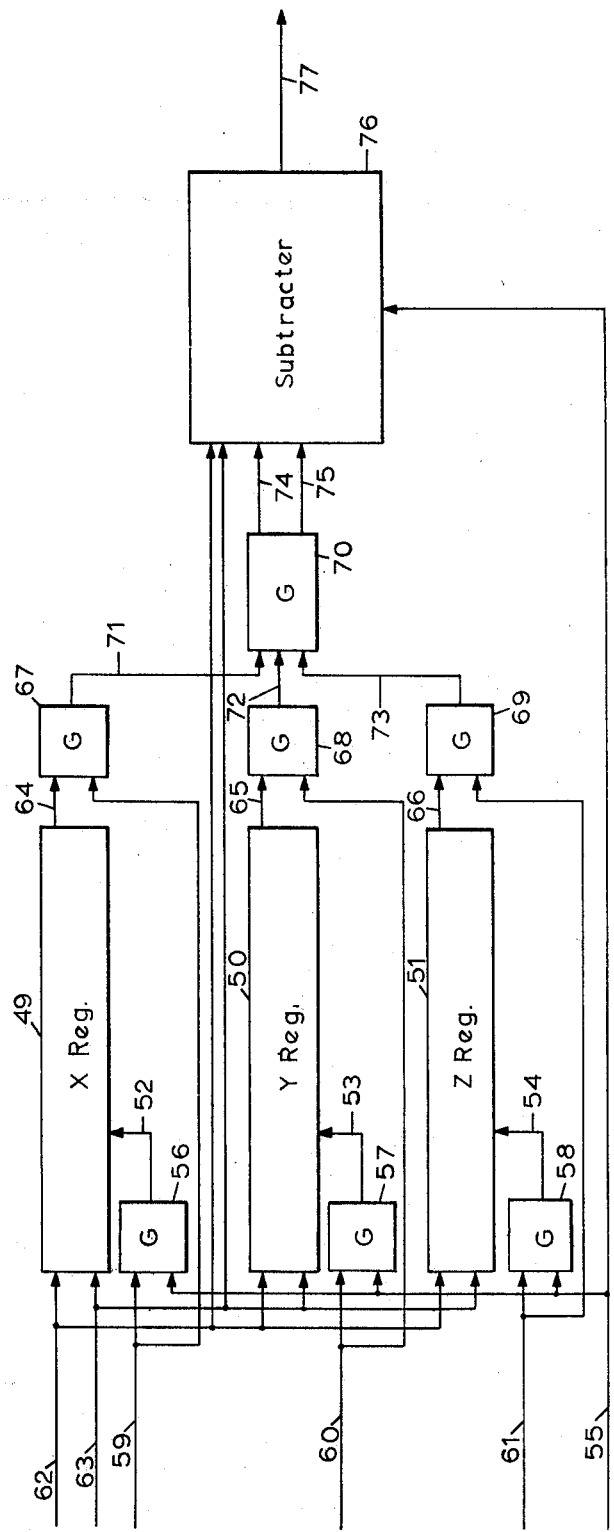

There is shown in FIG. 2 a more detailed block diagram of the previous point storage and differencing circuit 20 shown in FIG. 1. The circuit includes, in a three axis control system, three serial shift register storage circuits 49, 50, 51 corresponding to dimension storage in the X, Y and Z axis directions, respectively. The shifting of information into each of these is controlled in step by step shifts by a train of pulses on shift input lines 52, 53, 54. The shift pulses occur on a clock pulse line 55 which is connected as an input to each of three gate circuits 56, 57, 58 from which the shift lines 52, 53, 54 extend. The gates 56, 57, 58 are opened one at a time to pass a train of shift pulses to the registers 49, 50, 51 by a signal on one of a set of address lines 59, 60, 61 which extend from the reader and conversion circuit section 19. In the information blocks as read from the tape, the dimensions are each preceded by an axis address symbol which is recognized by the reader circuit 19 and this causes a signal to be connected to a corresponding one of the address lines 59, 60, 61 to open the corresponding one of the gates 56, 57, 58. Thus shift pulses are passed to the appropriate one of the shift registers 49, 50, 51 in correspondence with the coordinate direction of a new dimension number word. The dimension number words from the reader circuit are conveyed to each of the shift registers 49, 50, 51 via a pair of lines 62, 63, one being an assertion signal line and the other being a negation signal line. Only that one of the registers 49, 50, 51 to which the shift pulses from the clock line 55 are passed will have the new dimension shifted into it.

As the new dimensions are shifted into each of the registers 49, 50, 51, the previous point dimension word is shifted out on an output line 64, 65, 66, respectively, and each of these lines is connected as an input line to one of a set of gate circuits 67, 68, 69. As shown, each of the gates 67, 68, 69 is connected, respectively, to the address input lines 59, 60, 61 for control so that each is opened to pass the previous point number shifted out of the registers 49, 50, 51 to a succeeding gate circuit 70 by way of one of the signal lines 71, 72, 73. The gate circuit 70 produces an assertion and negation signal, respectively, on one and the other of a pair of input lines 74, 75 connected from the gate 70 to a full serial subtractor circuit 76. The assertion and negation input lines 62, 63 on which the new dimension words appear are also connected as inputs to the subtractor circuit 76. Thus it can be seen that both the new and the previous dimension number words for each axis are simultaneously connected to the serial subtractor 76. The serial subtractor 76 is driven by clock input pulses from the line 55 to produce a difference number word on an assertion output line 77. Since the new dimension words are inserted into the registers 49, 50, 51 as the previous words are shifted out, these new words are now stored to become the previous point information when the next succeeding block of information is read from the tape 18.

SIGN TEST AND NORMALIZING

The output from the subtracting circuit 76 is conveyed via the signal line 77 as an input to the next circuit block 21 in which the difference number words are normalized. The circuit 21 also includes a sign test register 78, FIG. 3, through which each of the difference number words is passed prior to normalization. It must be pointed out that each of the slides 15, 16, 17 is bi-directionally movable and therefore the control must recognize differences in two directions. The subtractor circuit 76 will produce a positive difference number if the new position dimension for an axis is greater than the preceding dimension along that axis, that is, it is a greater distance from the origin. The circuit 76 will also produce a negative difference number if the new dimension is smaller than the preceding point dimension but this negative difference is in its two's complement form as is conventional in computer manipulations. The most significant bit of a positive difference number word is a binary "zero" while the same bit in a two's complemented form, the negative difference number, is a binary "one." Therefore, by testing the most significant bit, the direction along one axis of the respective span represented by the difference number word conveyed on the line 77 to the register 78 can be determined. This is the purpose of the register 78 and its associated circuitry. The difference number is shifted into the register 78, as it is developed, by clock pulses connected via a conductor 79 from the timing and cycle control circuit 48. The pulses from line 79 are connected to a line 80 after passing through a gate 81. A logic "nor" circuit 82 is provided to invert the signal on the line 77 and to apply the resulting negation of the difference on a conductor 83 as the second required input to the register 78. When an entire difference number has been inserted into the register 78, that is all bits filled, a sample gate pulse is applied to a conductor 84 which causes a flip-flop circuit 85 to be set in accordance with the most significant bit flip-flop 86 of the register 78. The test flip-flop 85 is connected to the register flip-flop 86 by conductors 87, 88 to provide the indication of the most significant binary bit. The sign of the difference number as represented by the "zero" or "one" state produces a set or reset condition in the test flip-flop 85 and accordingly a corresponding voltage level is output on a conductor 89 which connects with a gate circuit 90. If the output signals a positive number, the gate 90 is set to pass signals from the output line 91 of the register 78 directly to a conductor 92. If the output signal level from the flip-flop 85 indicates a negative number, the gate 90 is set to pass signals from a line 93 to the conductor 92. The line 93 is an output conductor from a two's complementing circuit 94 to which the output of the register 78 is also connected. The complementing circuit 94 is a full series subtractor circuit to which one input is always binary "zero" and from which the negative binary difference number from the register 78 is subtracted to perform the complementing manipulation on the negative difference number. The number is shifted out of the register 78, after it has been completely shifted in, by a series of pulses connected to the gate 81 over a conductor 95 and then onto the shift register drive line 89. The number word shifted out appears on the line 91. Thus the binary number word appearing on the line 92 from the gate 90 will always be in the same form as if representative of a positive number. The sign test register output is also carried via a line 96 to the output accumulators which are set to add or subtract overflows as will be described subsequently herein. Thus, the control is set to react in the right direction when the interpolation over a span occurs, even though from the line 92 on through the interpolation, the circuits see only positive form difference number words. After each dimension is shifted into the sign test register 78 and after it has been shifted out, a clear pulse is connected via a conductor 95 to all stages of the register 78 in parallel and to the flip-flop 85 and complementer 94 so that these are all preset prior to the shifting in of the next difference number word.

The clock pulses on the lines 79, 95 are only passed through the gate 81 when a control signal is present on one of three control signal lines 98, 99, 100 which extend, respectively, from address gates 101, 102, 103 to which the decoded address signals from the reader circuit 19 are passed by conductors 104, 105, 106. Clock pulses are supplied to each of the gates 101, 102, 103 over a line 107 from the cycle control circuit and when an address signal is connected to one of these gates on its respective control line 104, 105 or 106, it outputs control pulses on the lines 98, 99 or 100 to coincide with pulses on either of lines 79 or 95 to open that gate and to cause the shift register 78 and complementer 94 to be driven.

The magnitude difference number words that are impressed on the conductor 92 are carried to each of a set of three gates 108, 109, 110 that connect the information as assertion and negation inputs to each of three shift register storage circuits 111, 112, 113, respectively, storing X, Y and Z axis difference number words. Only one of the registers 111, 112, 113 will accept any given difference number word. This is determined by the address signals on the line 104, 105, 106 since the control pulse output on lines 98, 99, 100 is also connected directly to the shift registers 111, 112, 113, respectively, as input drive pulses. In this manner each of the registers 111, 112, 113 is filled with an appropriate difference magnitude binary number word.

When each of the difference number words has been processed into its difference storage register 111, 112, 113, an end of block signal from a signal line 129 is connected to a gate 114 to set that gate to pass clock pulses from a clock pulse line 115 extending from the cycle control circuitry 48. The pulses are passed from the gate 114 to a line 116 which connects to a further gate 117 that passes the pulses on to a drive line 118 that connects as a drive input to each of the shift register circuits 111, 112, 113. Therefore the information is now shifted out of the registers 111, 112, 113 onto output lines 119, 120, 121, respectively. These output lines are each connected as an input to the gates 108, 109, 110 so that the information is shifted out and back in a cyclic manner. At this same time, the output lines 119, 120, 121 are parallel connected to a binary "one" detection circuit 122. This circuit 122 functions to produce a clear signal whenever any of the bits output from the registers 111, 112, 113 is a "one." The "one" detect circuit 122 is a gate circuit which passes the "one" signals through as clear signals to a conductor 123 which is parallel connected to each flip-flop stage in a normalizing shift register 124. The reset signal on the line 123 resets all stages of the register 124 to their "zero" state each time it occurs. The input signal to the register 124 is a constant "one" signal applied via a line 125 and a gate 126 which is opened to pass the "one" signal with each pulse on the line 116. The line 116 also connects to drive the shift register 124. The effect of this arrangement is to cause only those stages of the register 124 to be set in their "one" state which correspond to the leading zeros or most significant bit places of that one of the registers 111, 112, 113 in which the greatest difference number is stored after a signal recirculation of the difference numbers.

After the first complete circulation of difference numbers in the registers 111, 112, 113, the "one" detect circuit 122 is inhibited by a signal on a control line so that "ones" on the output lines 119, 120, 121 will not reset the register 124. The pulses continue on line 115 and therefore a second recirculation of the difference numbers is begun. At the same time, the binary value in the normalizing register 124 is cycled out onto an output line 127 which is connected back as an inhibit signal to the gate 126 and to the gate 117. In this instance, the true signal output on the line 127 occurs when the sampled flip-flop is in its negation state rather than when it is in its assertion state for reasons that will be apparent later herein. At any time a "one" is shifted out of the register 124, the gates 126 and 117 are inhibited. Therefore each of the difference numbers in the registers stop shifting when "ones" begin to appear at the output line 127 from the register 124. The effect is to stop the shifting when the one of the registers 111, 112, 113 in which the largest difference is stored has a binary "one" in its most significant bit place since the register 124 was set in the previous circulation to have "ones" only in those bits where no one of the difference registers 111, 112, 113 had a "one."

At some time after the completion of the second recirculation, i.e., after enough pulses have been applied to the line 115 to recirculate all bits in the registers 111, 112, 113, a start new span signal is applied on the input line 128 and this signal is conveyed to the gate 114 which is maintained open for a period during which drive pulses are applied to the line 116 and through the gate 117 to shift the contents of the registers 111, 112, 113 out on the lines 119, 120, 121. At this same time, the signal on line 128 is also applied to the gates 108, 109, 110 as an inhibit signal and this prevents the recycling of the normalized difference number words back into the registers 111, 112, 113. An inhibit signal is also applied via a line 130 to the "one" detect gate 122 to prevent the reset signals from occuring on the line 123. The clock pulse drive from the line 116 is also applied at this time to shift out the binary number word in the normalizing register 124 which number word is transmitted in its negated form from that circuit on the output line 127.

INTERPOLATION

Figure 4:
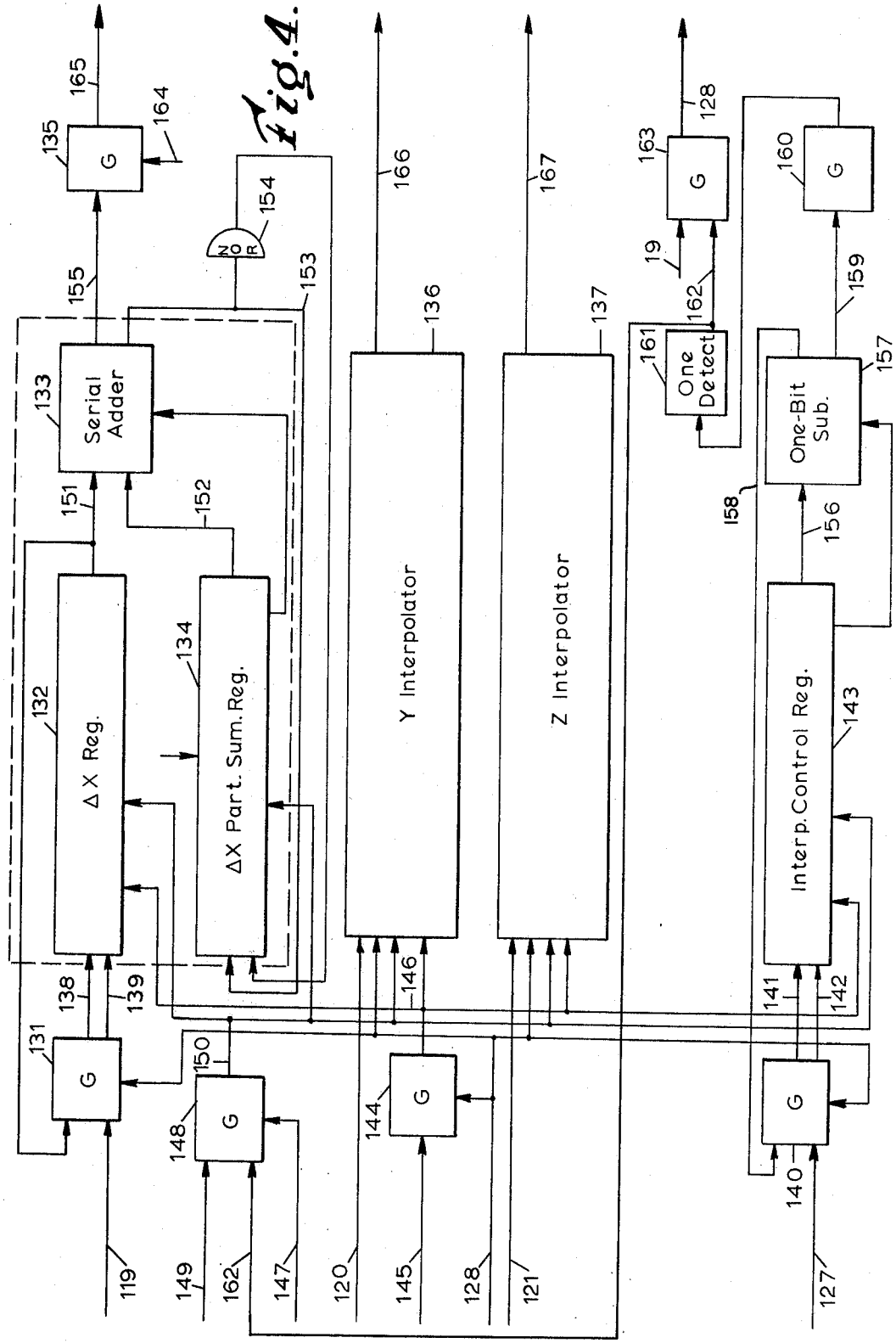

The interpolation circuitry is shown in FIG. 4. The output lines 119, 120, 121 and 127 of the normalizing circuits are shown as the information inputs to the interpolation circuitry. The X-axis interpolator is shown as being comprised of a gate 131, a difference register 132, a full serial adder 133, a partial sum register 134 and an output gate 135. Since each of the Y-axis and Z-axis interpolators is comprised of a circuit identical to the X-axis unit, these interpolators are represented as the blocks 136, 137 and it is understood that these represent the same five units as described for the X-axis with similar interconnection. A detailed description of the X-axis interpolation will be given hereinbelow and at the same time the identical process is carried on in each of the other two interpolation circuits 136, 137 since input drive and control signals are connected in parallel to each of the three interpolation circuits.

As was described, the normalized difference information is shifted out of the normalizing circuits via the lines 119, 120, 121 and these are the information inputs to the interpolation circuits. The modulus register output on the line 127 is also input to the interpolator circuitry to provide control information therein. At the same time that the start new span signal is applied on the line 128 in the normalizing circuits, it is applied to the gate 131, and to the other interpolators 136, 137 similarly, to set the gate 131 to transfer the information thereon as assertion and negation signals on lines 138, 139 which are input signal lines to the difference register 132. The control signal line 128 also connects with a gate 140 to set it to transfer the information on the line 127 as assertion and negation signals on lines 141, 142 which are input signal carriers to an interpolation control register 143. The new span control signal is also connected to a gate 144 which is opened to connect a train of clock pulses from a conductor 145 originating in the cycle control circuitry 48 to a drive line 146 connecting to each of the interpolator difference registers 132 and to the control register 143. This train of pulses is sufficient to shift the entire contents of the registers 111, 112, 113 and 124 into the respective interpolator circuits. In this manner, at the new span signal on line 128, the information concerning a new span is inserted into the interpolation circuitry of FIG. 4.

The interpolation process is driven by a series of discrete pulse trains occurring at a controlled rate. The drive is initiated by an iterate command signal on a control line 147. This signal is connected to a gate 148 which it opens for a period of time sufficient to pass a discrete train of pulses from a clock pulse line 149 to a drive line 150. The train of pulses on the line 150 is just sufficient to cycle the information in the register 132 once around and also that in the register 143. The difference registers in the interpolators 136, 137 also are similarly driven by pulses on the line 150. As can be seen, the partial sum register 134 is also driven by pulse trains on the line 150 so that the contents of that register are also shifted out in time with the information in the register 132. The outputs of the registers 132, 134 are connected via output lines 151, 152 as inputs to the full serial adder 133. The output on the line 151 is also connected back to the gate 131 which is set to connect the information back into the register 132 except when the new span signal is present on the line 128. Therefore the difference in the register 132 is cycled out around and back in. The sum from the adder 133 is connected via a line 153 to a "nor" circuit 154 which provides a negation signal and to the input side of the partial sum register 134. At the start of any particular interpolation over a span, the partial sum register is filled with "zeros" so that with the first iteration command, the partial sum is the normalized difference number. The second iteration command adds the difference from the register 132 to itself and if the sum exceeds the capacity of the partial sum register 134 which capacity is the same as that of the difference register 132, an overflow pulse is connected to an output line 155 coincident with the adding of the most significant bits of the two inputs. These iteration command signals continue to produce successive additions a number of times corresponding to the modulus of the normalized difference number in the difference register 132. In this process, a number of overflows is produced at the last serial bit addition and the number of these is equal to the numeric difference between the previous point and new point along the X-axis, this being the difference output from the subtractor circuit 76 with reference to the X-axis information. When the required number of additions is performed, the sum in the partial sum register 134 will also be all zeros so that it is clear for the next span. The line 146 does not drive the partial sum register 134 so that it remains zeroed until the next interpolation.

The information stored in the control register 143 is used in determining when the iterations of the interpolating circuits is equal to the modulus of the normalized difference numbers. The binary number word shifted out of the register 124, FIG. 3, via line 127 is the negation output rather than the assertion output that is normally used and it has "zero" values in the most significant digit places corresponding to those digit places from which the largest original difference number words had "zeros" eliminated in the normalizing manipulation. By using this negation output as the input, the input to the register 143 is the one's complement of the two's complement of the binary word in the register 124 and it is this one's complement word that is stored in the control register 143. This word in pure binary form represents a number having a numeric value one less than the modulus of the number shifted out of the registers 111, 112, 113, FIG. 4 on the new span signal.

With each iteration command on the line 147 and resulting discrete train of pulses on the drive line 150, the value in the control register 143 is shifted out on a conductor 156 to a one bit subtractor circuit 157 with a borrow memory which is set to subtract a single one bit for each time the output of the register 143 is cycled through it. The output from the subtractor is carried back on a conductor 158 to the gate 140 where it is cycled back into the register 143 but with a numeric value of one less than when shifted out. When a number of iterations equal to one less than the modulus of the normalized difference numbers is complete, the control register will have all "zeros" stored therein, and the next iteration will result in a borrow signal in the subtractor 157 and a resulting signal on an output line 159. The borrow signal is connected through a gate 160 as a "one" signal that is detected in a "one" pulse detector circuit 161 which outputs an end of span signal on a conductor 162. This signal is connected back as an inhibit signal to the gate 148 to stop the iterate commands on line 147 from producing the discrete pulse train outputs on the line 150. The end of span signal is also connected to a gate 163 to which an end of block signal from the reader circuit 19 is connected and when both are present, the start new span signal is output therefrom on the control line 128. Therefore, the iterative addition in the interpolation circuit is terminated after the modulus number of additions and the next new span information is caused to be inserted into the appropriate registers.

OUTPUT ACCUMULATION

Figure 5:
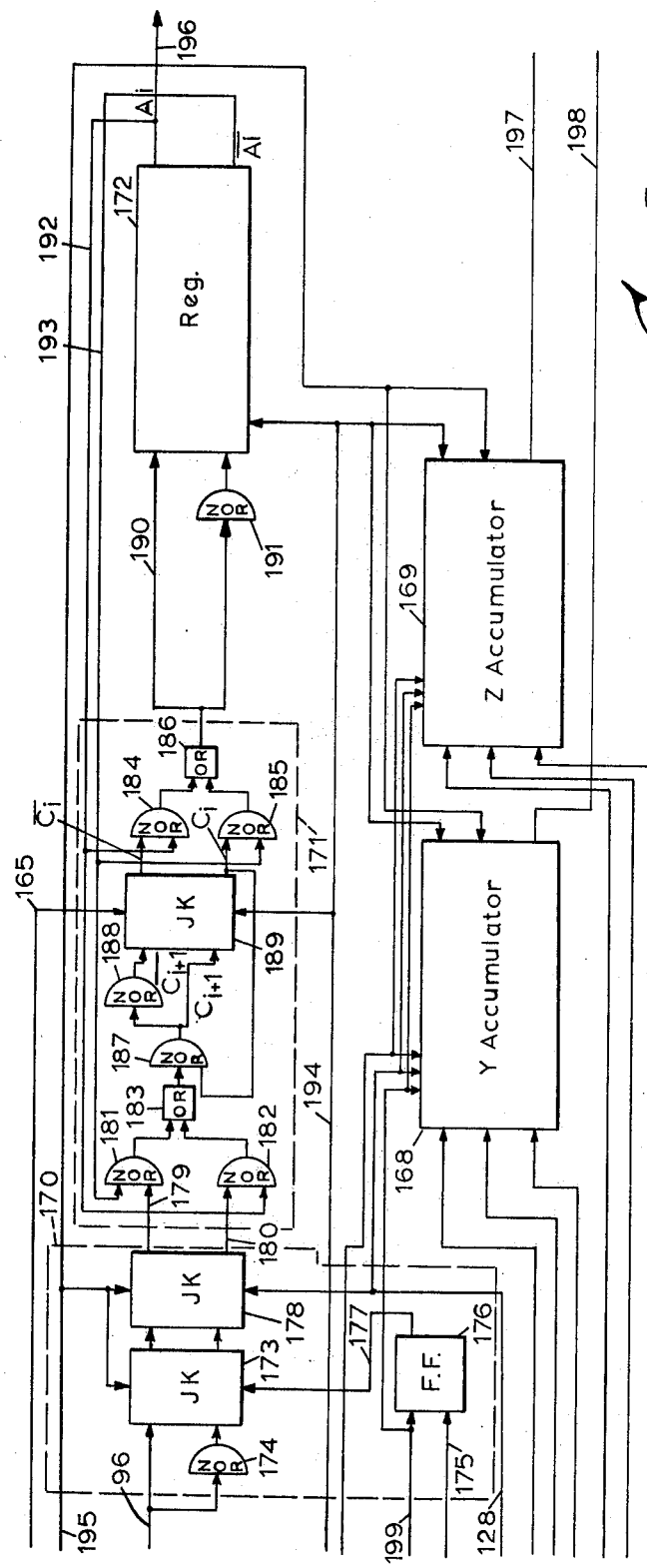

The overflow signals pass over the line 155 to the gate circuit 135 from the serial adder 133. The gate circuit 135 is gated by a clock pulse on an input line 164 at the completion of an iterative addition in the interpolator and if there is a carry or overflow signal at the last bit addition, it is transmitted to the interpolator output line 165. The other interpolators 136, 137 also provide an output on similar output lines 166, 167 at the same time if they also have a carry on the same iteration. Since the difference number words can all be of different magnitudes, there will not always be carries on all of the lines 165, 166, 167 simultaneously. The output signals which occur on the lines 165, 166, 167 are taken to the respective output accumulator circuits of FIG. 5 where these outputs are accumulated as they occur to incrementally develop binary number words changing from one programmed dimension to the next along the respective axes. The output accumulators are each like the other and therefore only the X-axis circuit is shown in detail in FIG. 5. The Y-axis and Z-axis circuits are shown only as the blocks 168, 169.

The output accumulators are each comprised of an input setting circuit 170 by which the next circuits are conditioned to add or subtract the overflows from the interpolation process. The next portion of the circuit is a single bit adder/subtractor circuit 171 with a carry memory portion and it is identical with the circuit 157 in the interpolator control section of FIG. 4. Finally there is a shift register 172 in which the accumulation is stored and to which each overflow bit is added or from which these bits are subtracted.

Figure 3:
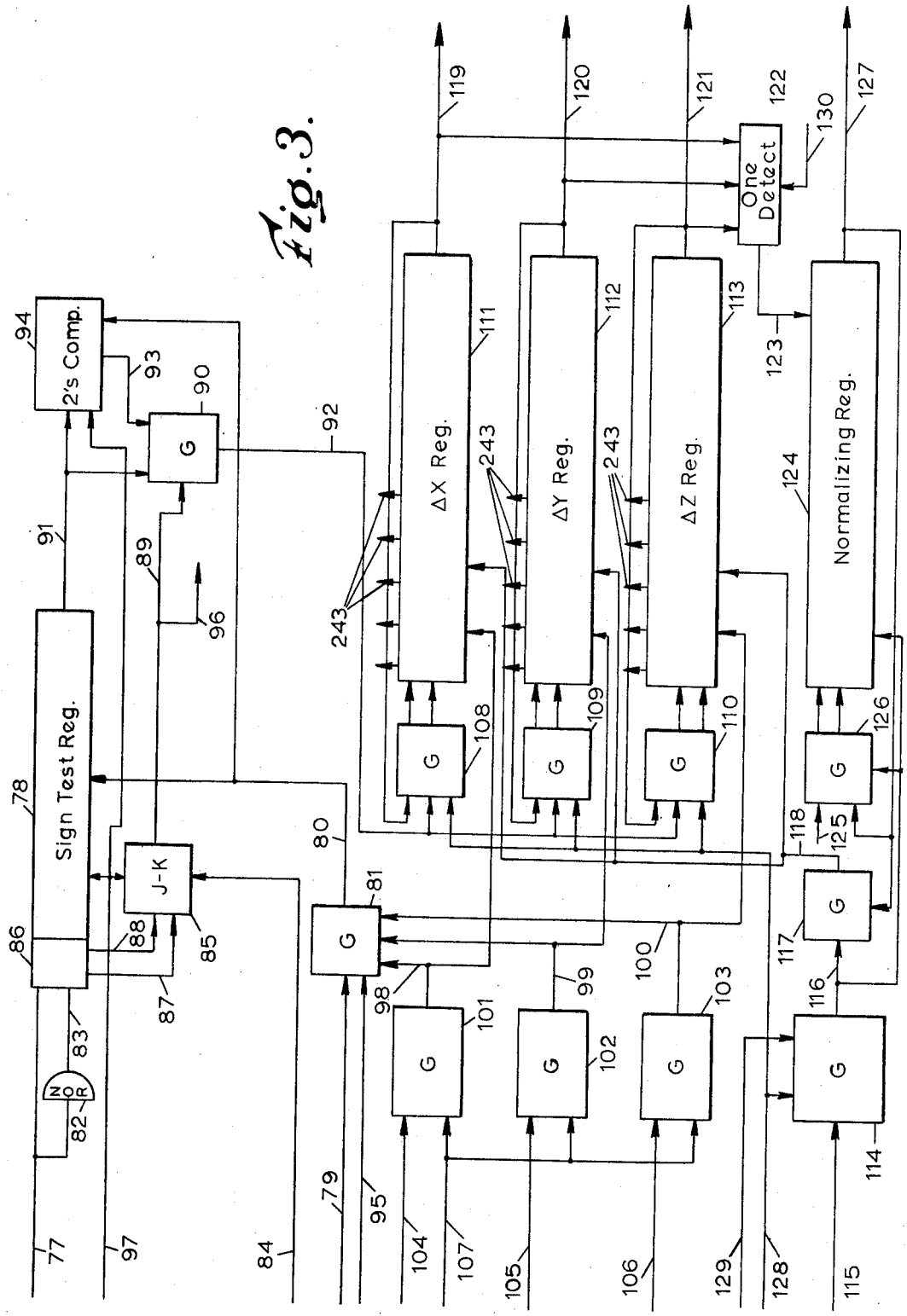

The input circuit 170 operates to set the adder 171 to add or subtract the overflows. The sign test output from the bit register 86, FIG. 3, as passed through the flip-flop 85 to the lines 89 and 96, which is connected to a flip-flop 173 and to a "nor" circuit 174 which provides the negation input to the flip-flop 173. At this same time, an X-axis address is connected over a conductor 175 to a flip-flop 176 which outputs a signal on a line 177 to condition the flip-flop 173 to be set by the signal on the line 96. Thus, the flip-flop 173 is set to identify the sign of the X-axis difference that is next to be used in the interpolation process after normalizing. The input circuits of the accumulators 168, 169 are similarly set in succession since the difference number words from the same information block as that from which the flip-flop 173 was set are passed through the sign test register 78. The new span signal on the line 128, FIGS. 3, 4, are also applied as an input to the accumulator circuits of FIG. 5 at the same time that the new span information is dumped from the normalizer difference registers 111, 112, 113 into the interpolator registers 132, 133, 134. This signal is connected to an active flip-flop circuit 178 and to similar flip-flops in the accumulators 168, 169 at the same time. This new span signal conditions the flip-flop 178 to be set and it is then set in the same state as the flip-flop 173 has been set. A reset pulse is applied to the shift register 176 over an input line 199 after the new span signal on the line 128 and this effects a signal change on the line 175 that sets the flip-flop 173 in an aligned state ready for the next signal on line 96.

Figures 6, 8:
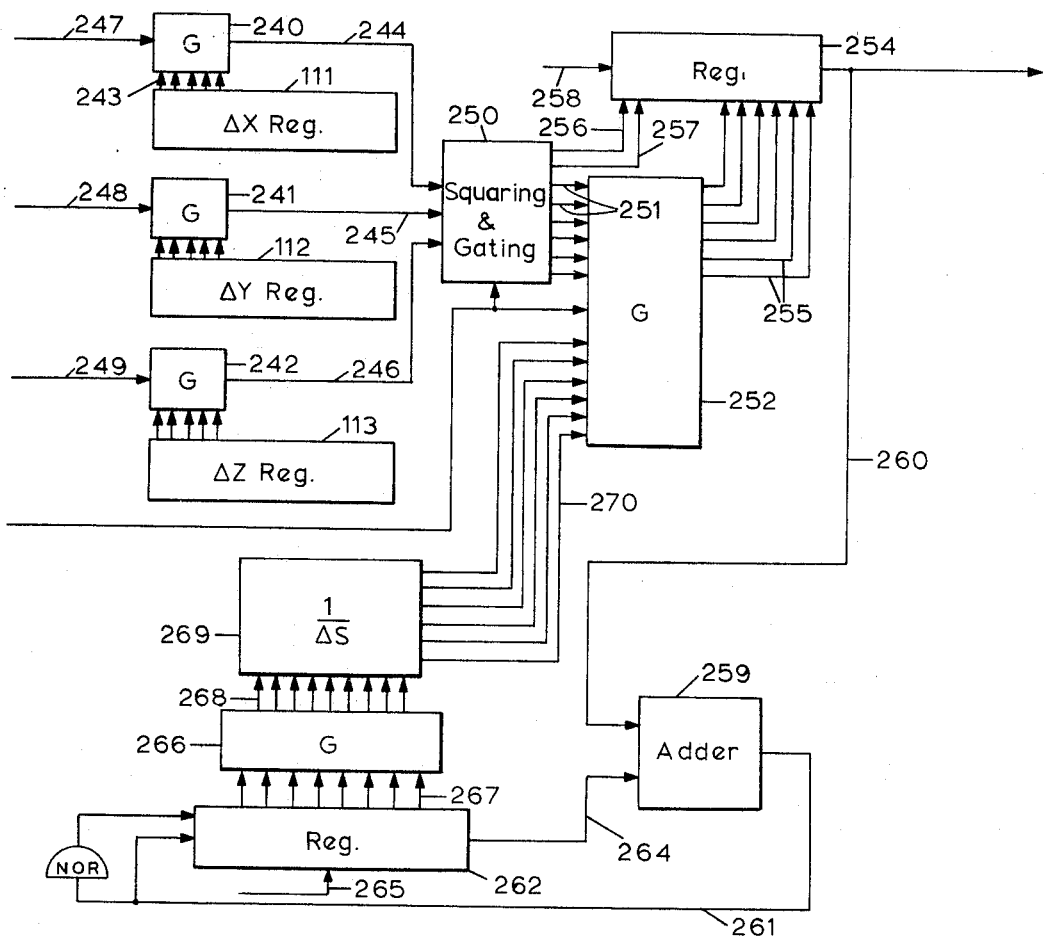
FIG. 6 is a logic truth table.

The output of the flip-flop 178, as indicated by the signal levels on lines 179, 180, sets the adder/subtractor circuit to either add or to subtract. The adder circuit 171 is comprised of two half adders, the first comprised of the "nor" circuits 181, 182 and an "or" circuit 183. The second half adder is comprised of "nor" circuits 184, 185 and an "or" circuit 186. Between these is a carry memory circuit comprised of two "nor" circuits 187, 188 and a flip-flop 189. The signal from the "or" circuit representing the sum output is connected via a line 190 to the register 172, the line 190 also being connected as an input to a "nor" 191 to produce a negation input for the register 172. The serial outputs of the registers 172 are connected back as inputs to the "nor" circuits 181, 182 and 184, 185, respectively on output lines 192, 193. A truth table for the adder circuit 171 is shown in FIG. 6 to illustrate the functioning of this circuit. The signal designation used in the truth table are indicated in association with the appropriate conductors of the flip-flop 189 and the output lines 192, 193 of the register 172. The output signals on lines 192 and 193 are the $A_i$ and $\overline{A_i}$ inputs to the input "nor" circuits 181, 182, these signals being identified conventionally as assertion and negation signals, respectively. The inputs to the carry memory register 189 are identified as $C_{i+1}$ and $\overline{C_{i+1}}$ and the outputs of that circuit are identified as $C_i$ and $\overline{C_i}$. In the add mode of operation, the input on line 179 is an assertion signal while that on line 180 is a negation, this being reversed in the subtract mode of operation.

The input drive to the register 172 is directly from the master oscillator output over an input line 194. The clock pulses on the line 194 drive both the shift register 172, all stages of it, and also the flip-flop 189 in the carry memory portion of the adder circuit 171. At the start of operation of the machine, an align signal is applied over an input line 195 and this signal is paralleled to all stages of the shift register 172 to set them to their "zero" state. At the same time, the line 195 also connects the align signal to the two control flip-flop circuits 173, 178 to set these in an initialized state, in the system described, this is the add state since the alignment clears the register 172 to "zero" and all dimensions start from that point, there being all positive dimensions from that point and no dimension is ever in the negative direction from this zero point. Therefore the first span after an alignment is in a positive direction. The align signal on line 195 must be at least longer than one master oscillator cycle to insure that one drive pulse is applied to the flip-flop 189 so that it will be initialized to zero or no carry.

The contents of the register 172 are shifted out serially as a binary number word on an output line 196 as the register is driven and the number word magnitude grows incrementally with the accumulation of overflows from the adder 133 in the X-axis interpolator. Similar manipulations occur simultaneously in the accumulators 168 and 169 to incrementally generate Y-axis and Z-axis dimensions which are output on lines 197 and 198. The rate of growth of these numbers is controlled by the rate of iteration command signals that are applied in the interpolation circuitry over the line 147, FIG. 4. Since the rate of operation of the motors 42, 43, 44, FIG. 1, and therefore the rate of movement of the slides 15, 16, 17 is directly proportional to the rate of change or growth of the numbers, either positively or negatively, in the accumulators 25, 26, 27, the rate of slide movement is directly proportional to the iteration command signals on the line 147.

FEED RATE CONTROL

Figure 7:
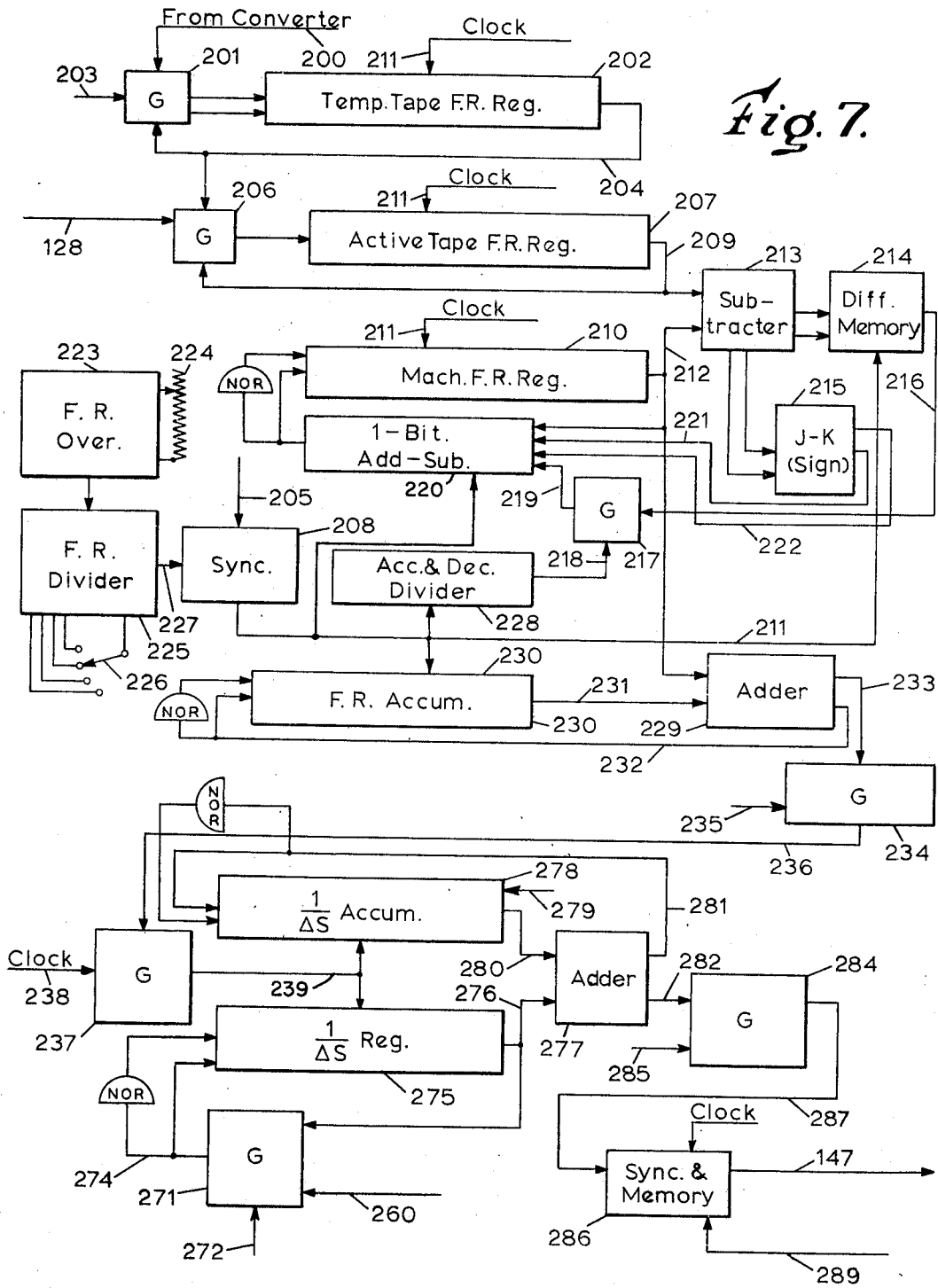

The iteration command signals are controlled by the circuitry shown in FIGS. 7 and 8. A feed rate is programmed on the tape 18 as part of some blocks of information. The feed rate information is decoded in the converter portion of the reader circuit 19 and is serially passed over a line 200 to a gate 201 through which it is passed and by which it is transformed to assertion and negation inputs to a temporary feed rate storage register 202. The gate is supplied with a control signal over a line 203 while a feed rate number is read and converted, the control being produced by an address code on the tape 18. The gate 203 is set to input the output of the register 202 back into itself over the line 204 when the control signal on line 203 is not present. The master clock pulse input is connected over a line 205 to supply a series of constantly occuring drive pulses. The pulses on the line 205 are connected to a synchronizing gate 208 that passes spaced trains of pulses to a drive line 211. The operation of the gate 208 will be explained later herein. The drive line 211 is connected to each of the stages within the register 202. Therefore, except when the register 202 is being filled with new information, the contents thereof are constantly recirculating in time with pulses on the line 211, there being sufficient pulses in each of the spaced trains to recycle the contents of the register 202 one time.

The output line 204 is connected to a second gate 206 and this gate has a control signal applied thereto upon the occurrence of a new span signal since the line 128, FIG. 4, is connected directly to it. Upon the occurrence of the start new span signal, the gate 206 is opened to pass digital information from the line 204 into an active feed rate register 207. The register 207 is also constantly driven by the trains of clock pulses applied over the drive line 211 and the digital number serially applied on its output line 209 is carried back to the gate 206 which normally passes the signal on the line 209 back into the register 207. Thus the digital number word in the register 207 is also constantly recycled at intervals, except when the number word from the register 202 is applied to it during the start new span signal on the line 128.

The feed rate control circuit also includes a third register 210 which stores a binary number word the magnitude of which is directly proportional to the iteration control pulses as will be seen later herein. This register 210 is also constantly driven by the trains of master clock pulses applied to it from the line 211. The contents of the register 210 are shifted out on a line 212 which is one input to a full serial subtractor circuit 213, the other input being the contents that are shifted out of the active register 207 since the line 209 is connected as an input to the subtractor 213. The subtractor circuit 213 functions to compare the magnitudes of the contents of the registers 207 and 210. When there is a difference, a memory flip-flop 214 comprising a difference memory circuit is set and maintained in a state that is indicative of a difference in magnitude between the two number words.

The direction of the difference, that is, the sign of the difference, is sampled and a flip-flop 215 is set in a state corresponding to the direction. The difference memory circuit 214 when set to indicate a difference produces a control signal output on a line 216 which opens a gate circuit 217 to pass a pulse from a line 218 to a preset line 219 that applies pulses to preset a carry into a single bit adder/subtractor circuit 220 like the circuit 171 in the output accumulators, FIG. 5. The sign storage flip-flop 215 supplies signal outputs on conductor 221 and 222 which connect with the adder/subtractor 220 and sets this circuit to either add or subtract in accordance with the direction of the difference detected in the subtractor 213 and in the same manner as the flip-flop 178 sets the adder 171 in the output accumulator.

The adder/subtractor circuit 220 is also driven by the pulse trains that occur on the drive line 211 as is the difference memory flip-flop 214. Therefore, all of the circuitry described thus far in regard to FIG. 7 is driven in synchronism. A feed rate override control is provided in the system whereby the machine operator can change the range of operation by selected percentages. It is also possible that this same control can be set by automatic override circuitry that senses the cutting conditions or like parameters in a machine tool in which the slides 15, 16, 17 provide the relative movement. The circuit is therefore provided with a voltage controlled oscillator 223 which outputs a train of pulses the frequency of which is dependent upon the adjustment of the potentiometer 224. The pulses from the oscillator 223 occur at a range of rates that is substantially below the pulse rate of the master oscillator in the cycle control circuit 48 which supplies the pulses to the line 205. The pulse train output from the oscillator 223 is connected to a pulse rate divider circuit 225 which can be set to divide the rate of repetition by one, one-half, one-fourth or one-eighth according to setting of a selector switch 226. This provides a second convenient method for changing the feed rate as will be seen. The pulses from the divider 225 are output as a train on a conductor 227 which connects as the control signal input to the synchronizing gate 208. Thus a train of control pulses is applied to the gate 208 at a frequency that is directly dependent upon both the setting of the potentiometer 223 and the switch 226. Each of these pulses on the line 227 is of such a width as to open the gate 208 to pass a train of pulses sufficient in number to cycle all of the registers 202, 207 and 210 one time, these registers all being of the same storage capacity.

It is the function of the adder/subtractor circuit 220 to change the number stored in the register 210 until it corresponds to the number stored in the active feed rate register 207, which number came originally from the tape 18 as part of a block of information for one span of movement along the curve to be generated by movement of the slides 15, 16, 17. Therefore, the number word shifted out on the line 212 from the register 210 is connected as an input to the adder/subtractor 220 and is cycled therethrough. On predetermined cycles of the number word into the circuit 220, that circuit will be preset with a carry or borrow signal depending upon the output of the sign storage circuit 215 which sets the circuit 220 to add or subtract. The carry signal is passed from the line 218 to the line 219 as long as the subtractor 213 detects a difference. When no difference is detected, the gate 217 will not pass the presetting signals from the line 218 although they continue to occur. The presetting signals on the line 218 are supplied from a second pulse divider circuit 228 which is preselected to produce a single pulse output for each time a number of the trains of oscillator pulses are supplied to the line 211 which is the drive input to the divider 228. For example, a pulse can be output on the line 218 for each three of the spaced discrete trains of pulses from the gate 208. This controls the rate of acceleration and deceleration in the machine. The circuit 228 is designed to perform a fixed division in any given control and the division is dependent upon the physical capabilities of the mechanical machine components to accelerate and decelerate.

By the circuit arrangement described, the binary number information in the register 210 is cycled out and through the adder circuit 220 at a rate dependent upon the frequency of trains of pulses on the drive line 211. For each one of a preset number of these trains, a preset pulse will be applied to the line 218 and if there is a difference between the number cycled out of the register 210 and the register 207, the preset pulse will be transmitted to the adder/subtractor circuit 220. Whether this preset is applied as a borrow signal or carry is determined by the outputs of the sign detection and storage flip-flop 215 which in turn depend upon the magnitudes of the numbers from the registers 207 and 210. If the number in the register 207 is the greater, the circuit 220 adds and so the preset is a carry. If the number from the register 207 is the smaller, the preset effects a borrow. Since the output of the adder circuit 220 is input back in the register 210, the binary number therein changes incrementally until it matches the number in the register 207 at which time it ceases to change.

The binary number word that is cycled out of the register 210 onto the line 212 is also connected as one of two inputs to a full serial adder circuit 229. A partial sum register 230 is also provided in the system and its output is carried to the adder 229 over a line 231 to provide the second input. The register 230 is also driven by the same pulse trains on line 211 so that the two inputs to the adder 229 are in time, the register 230 being of the same bit capacity as all the other registers 202, 207 and 210. The sum output from the adder 229 is carried back over a conductor 232 and is inserted back as the input to the register 230.

The carry signals from the adder circuit 229 are transmitted via a conductor 233 to a sampling gate circuit 234 that is driven to sample the carry output at the last or most significant bit of the serial number as they are cycled through the adder 229. The sample signal is applied over a line 235 to the sampling gate 234. If a carry signal is present on the line 233 at the addition of the final bits then the actual sum exceeds the capacity of the register 230 and at this condition the gate 233 operates to output a carry signal on an output line 236. It can be seen that the rate of overflows or carries on the line 236 is directly proportional to the magnitude of the binary number stored in the register 210 and also to the frequency of the drive trains on the line 211. If the number in the register 210 is changing, the rate or frequency of overflows will also be changing at a directly proportional rate of acceleration or deceleration. The pulses on the line 236 are transmitted to a gate circuit 237 to which clock pulses from the master oscillator circuit 48 are also transmitted over a line 238. The gate 237 passes trains of clock pulses in time with the pulses on the line 236, that is, the trains occur at a rate of repetition equal to the rate of pulses on the line 236. These trains output from the gate 237 are applied over a line 239 to a circuit which ultimately outputs the iteration pulses on the line 147 to the interpolators.

The circuit also provides an adjustment of the iterate command signal rate in accordance with the vector sum, the adjustment being made to vary the rate inversely relative to the vector length of span represented by the spans in each of the directions of coordinate movement, that is along the reference X, Y and Z-axes. The error that can be tolerated in the feed rate is fairly sizable and therefore an approximation of the vector sum is made in the control, the accuracy of this approximation being enhanced by the normalization of the respective span lengths in the circuitry of FIG. 3. The computing circuitry for providing the reciprocal of the vector sum, that is, the reciprocal of the square root of the sum of the squares, is shown in FIG. 8.

The normalizing registers 111, 112, 113 are shown in FIG. 8 as well as in FIG. 3. Each of these registers has a gate circuit 240, 241 and 242, respectively, associated with it and parallel signal carriers, for example the signal lines 243, extend from a selected number of the most significant bit stages. The signals on the lines 243 are dependent upon the binary bits stored in the respective stages of the registers 111, 112, 113. Each of the gates 240, 241, 242 has an output cable 244, 245, 246 and these each have a number of parallel conductors equal to the number of input lines 243 to each of the gates 240, 241, 242. Therefore, upon the occurrence of a gating signal on each of a set of control lines 247, 248, 249, the information in the selected bit stages of the registers 111, 112, 113 is passed in parallel to a computing circuit 250 which is a digital squaring circuit. The gating signals on the control lines 247, 248, 249 occur sequentially after the completion of the normalizing process and emanate from the cycle control circuitry 48. Thus, the binary number words contained in these registers are sequentially connected to the circuit 250 where they are each squared.

The squared value from the circuit 250 is passed over parallel conductors 251 to a gate circuit 252 which is operated at this time to parallel connect the squared value into a storage register 254 over a set of parallel conductors 255. It is noted that the two most significant bits from the squaring circuit 250 are connected directly to the register 254 over conductors 256, 257. The register 254 is time shared to perform two distinct storage functions, as will be apparent from later description, and in the second mode of use, the two most significant bits are not used. The register 254 is driven by a train of clock pulses over the line 258 to serially shift out the squared value to a full serial adder circuit 259 over a conductor 260. The sum from the adder circuit 259 is transmitted over a line 261 and stored in a register 262. At the start of each computation for information from a single information block, the register 262 is cleared. Therefore, the first sum from the adder 259 is the same numerical value as the squared value sampled from the first normalizing register, that is the X-axis register 111, since the output of the register 262 is shifted serially out to the adder 259 over a line 264 in time with the information from the register 254 to produce the sum. The register 262 is driven by clock pulses over line 265 that are begun in time with the pulses on the drive line 258 to the register 254. After the first squared value or X-axis difference square is stored in the register 262, the Y-axis normalizing register is sampled, the value squared and passed to the register 254. Now as the registers 254 and 262 are driven, the adder 259 produces the sum of the squares of the X and Y-axis differences which sum is stored back in the register 262. The Z-axis difference is then squared and similarly shifted out of the register 254 in time with the sum in the register 265. As a result, the sum of the squares of the X, Y and Z-axis differences, or the vector sum, is produced in the register 262.

Once the full vector sum is stored in the register 262, a gate 266 is controlled to parallel shift the information out over lines 267 to the parallel input lines 268 which connect the information to a combination circuit 269 that digitally computes the reciprocal of the sum of the squares. The output of the combination circuit 269 is in parallel over the lines 270 that connect with the gate 252 and this gate now is controlled to apply the signals on the lines 270 to the lines 255, the two most significant bits now being unused in the register 254. Thus, the register 254 is now employed to store the reciprocal of the vector sum, which value is shifted out serially on the line 260 that is connected to a gate 271, FIG. 7, which is now operated by a control signal applied over a line 272 to connect the serial reciprocal signal to an input line 274 over which the binary information is passed to a register 275.

As was previously described, trains of clock pulses are applied to the line 239 which is connected as the drive line to the register 275. Therefore, for each pulse on the line 236, the reciprocal of the sum of the squares is serially cycled out of the register 275 onto a line 276 that is one input to a full serial adder circuit 277. The reciprocal number value cycled out of the register 275 is also connected as an input to the gate which is now set to connect the line 276 to the line 274 so that the information in the register 275 is shifted out and back in cyclicly with the occurrence of the trains of pulses on the line 239. The drive pulses on the line 239 also drive a partial sum register 278 which is cleared by a signal on a line 279 at the same time that a new reciprocal value is shifted through the gate 271 to the register 275. The output of the register 278 is shifted out over a line 280 as the second input to the adder circuit 277. The sum from the adder 277 is cycled back as the input to the register 278 over a line 281. Therefore the binary number word that represents the reciprocal of the vector sum is iteratively added at a rate dependent upon the frequency of pulses on the line 236. The carry signals in the adder 277 are connected over a line 282 to a sampling gate 284 which is controlled by a pulse over a line 285 to open when the most significant bits are added so that overflows are detected and connected as an input to a synchronizing gate 286 over a line 287. The circuit 286 has as an input thereto the clock pulse rate over a line 288 and an iterate command gate over a line 289. The iterate command gate originates in the cycle control circuit 48 to insure that the iteration trains of pulses on the line 147 begin to occur after new span information has been transferred into the interpolators from the registers 111, 112, 113, FIG. 3. The iterate command signals occur in the form of discrete trains of master clock pulses and the trains occur in time with the overflows on the line 287. It can be seen that this repetition rate of discrete trains is directly proportional to the programmed feed rate and inversely proportional to the length of a span. The rate can further be directly adjusted by means of the override potentiometer 224 or by the setting of the switch 226 of the feed rate divider circuit 225.

CYCLE CONTROL

The cycle control circuit 48 is shown in more detail in the information flow block diagram of FIG. 9. The diagram also includes the reader and converter block 19 for convenience. The control circuit 48 includes a master oscillator 292 which outputs a train of pulses on a master drive line 293. The frequency of the oscillator 292 is a relatively high one and in the specific example a frequency of one megacycle is used. The output pulses on the line 293 are connected to a synchronizing circuit 294 through which the clock pulses are passed on a drive line 295 to a timing counter circuit 296. The counter circuit 296 is comprised of twelve shift registers SR1–SR12 connected in a ring and these cycle continuously when the oscillator 292 is in operation and the circuit 294 is not inhibited. By using both assertion and negation output signals from the twelve registers, that is a "true" signal level output for the set and reset conditions, respectively, of each register in the ring, twenty-four specifically identifiable timing pulse periods can be obtained. Each of the registers SR1–SR12 has a pair of output lines 297, 298 which provide a decoding and gating circuit 299 with signals, the level of which indicates the set or reset condition and furnishes the assertion and negation signal to the separate decoding and gating circuits within the circuit unit 299.

Figure 10:
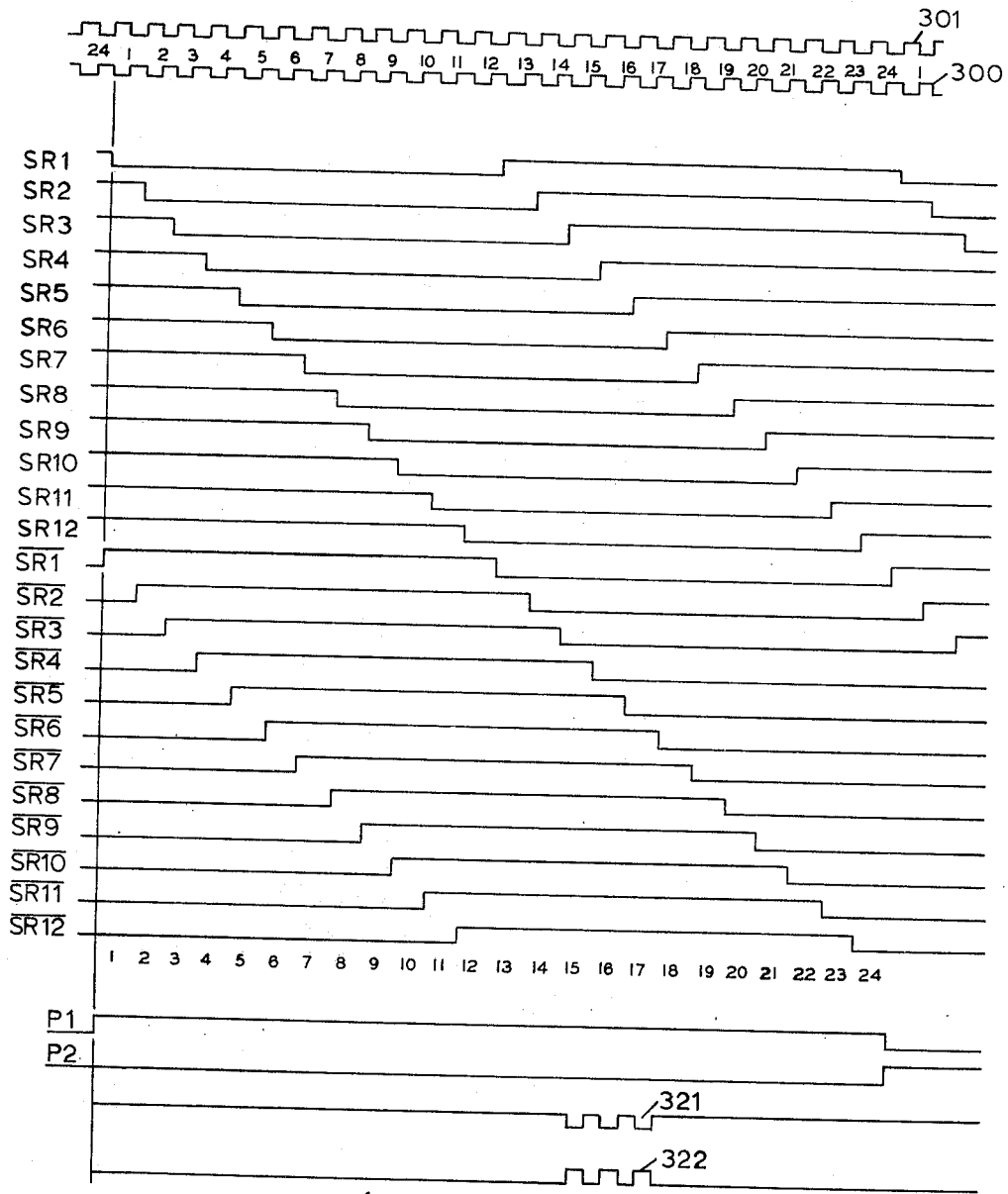

The theory of the decoder circuits 299 can be seen from the timing diagram of FIG. 10. The assertion or set condition output wave shapes for the registers within the counter 296 are shown in alignment with the register designations SR1–SR12. A negative level in these signals is defined as a "true" condition and a positive level as a "false" condition. The negation wave shapes or signals corresponding to the reset condition of the registers are shown with the conventional designations $\overline{SR1}$–$\overline{SR12}$ and the "true" signal in this case is also the negative signal level. The assertion and negation signals corresponding to the master clock outputs from the oscillator 292 and synchronizer 294 are also shown in FIG. 10 as the wave shapes 300, 301 respectively. It can be seen that it requires the full twenty-four assertion clock pulses to completely cycle all of the registers SR1–SR12 through their assertion and negation conditions in sequence. By using the signals shown in FIG. 10 as control signals to determine the time of gating of master clock pulses, any particular ones of the clock pulses in a twenty-four pulse cycle can be gated to a particular circuit, including a discrete output train of twenty-four pulses. These signals as selected are output to the control over a set of lines 302.

The timing circuit of FIG. 9 also includes a phase counting circuit 303 which is comprised of four shift registers SR21–SR24 connected in a ring and used in a manner like the register SR1–SR12 to provide eight distinct gate periods by using the assertion and negation signals which are "true" and "false" in correspondence with the set and reset conditions of the registers SR21–SR24. The phase counting circuit 303 is driven by pulses carried over a drive line 304 which extends from a synchronizing gate 305. The gate 305 receives a strobe or sprocket pulse input over a line 306 from the reader and an end of count twenty-four signal from the decoding circuit 299 over a control line 307. Both of these must have a true signal to start the operation of the phase counting circuit 303, that is to open the gate 305 to pass pulses onto the drive line 304. Each of the end of count twenty-four signals on line 307 will thereafter pass to the shift register ring 303 and advance it one step until a phase count eight signal is applied over a line 308 to the synchronizer 305 from a decoding and gating circuit 309 similar containing logic circuits similar to those in the circuit 299. The synchronizer 305 will be inhibited until the next tape strobe or sprocket pulse. Therefore, the counter 303 will produce eight distinct conditions from which corresponding gate signals P1–P8, FIG. 12, each lasting for twenty-four master clock cycles and occurring in succession after each new line of tape 18 is advanced and positioned for reading. The phase count outputs are developed on a set of output lines 310 and result from the decoding and gating action in the circuit 309 from assertion and negation signals carried there over lines 311, 312 originating at each of the registers SR21–SR24.

Figure 11:
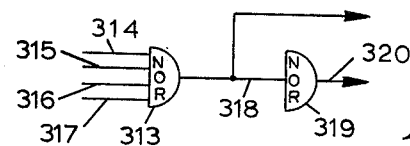
FIG. 11 is a block diagram of a modular logic circuit.

There is shown in FIG. 11 a gate circuit that is typical of the elements within the decoding and gating circuit 299. The circuit includes a "nor" gate 313 to which four inputs are connected on lines 314–317. One input, line 314, is the master clock. Another input line 315 is the assertion gate signal from the register SR3. The third input on the line 316 is the negation signal from the register SR6, the signal $\overline{SR6}$ in FIG. 10. The final signal is the first phase negation signal, shown in FIG. 10 as the signal $\overline{P1}$. When any one of these signals is at a true logic level, the output on the line 318 is at a false logic level. This signal is also shown in FIG. 10 as the wave shape 321. A further "nor" circuit 319 is provided to invert this signal and produce an assertion output on the line 320, shown as the wave 322 in FIG. 10. The input signal $\overline{P1}$ is a wave shape that is negative at each time the wave P1 of FIG. 12 is positive. This wave is provided by taking the wave output P1 on the respective output line 310 and passing it through a "nor" logic element like the element 319. In same type of decoding as shown in FIG. 11, using the assertion and negation signals from the counter 296 and other of the phase output gates from the decoder 309, the circuit 299 is able to produce outputs on the set of lines 302 that correspond to any predetermined pulse or pulses within any one of the eight twenty-four pulse, phases of each data processing interval.

DATA PROCESSING CYCLE

Figure 13:
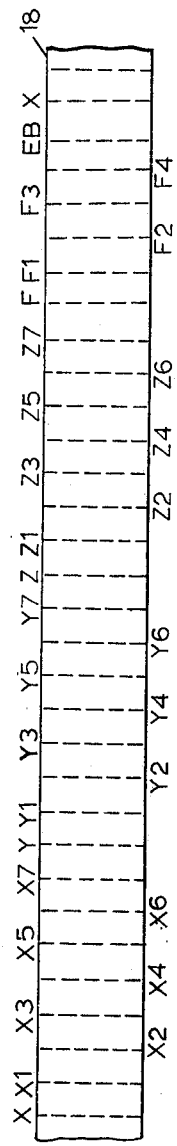
FIG. 13 is a simplified representation of a portion of a tape record as employed in the system of FIG. 1.

The control apparatus described in FIGS. 1–8 utilizes the eight data processing phases of twenty-four counts each in processing information from the tape 18 into the interpolators 22, 23, 24. The phases are each produced for every line of information on the tape 18 that is moved to the reader 19 but in each line, not all phases are utilized. This can best be illustrated with regard to the information as provided by the tape 18. Therefore, there is shown in FIG. 13 a portion of the tape 18 containing one full block of information with each line in the block being represented by a dashed line thereacross for simplicity. The block includes three dimension words in binary coded decimal form each preceded by an alphabetic address symbol at the tape lines X, Y and Z to provide a reference to the respective axis along which each dimension is referenced. The dimension word digits are identified as X1–X7, Y1–Y7 and Z1–Z7, there being seven digit places in each. A four digit feed rate number word is also included in the block, this word comprising the lines F1–F4 and preceded by the alphabetic address symbol in the line F. The block is concluded by an end-of-block symbol in one line EB. This illustrates a full block of information on the tape 18.

Prior to reading the block of tape of FIG. 13, which for illustration herein will be considered as the first block in a control sequence, the control must be turned on and aligned. The timing diagram of FIG. 12 illustrates the initial start-up of the control and the first two data processing phase cycles. When the circuit is first turned on and until the first eight phases have been cycled through the control circuit 48, particularly the decoder circuit 299, outputs a clear signal shown as the wave shape 323 in FIG. 12. The timing circuit of FIG. 9 is shown with a master reset switch 324 by which the machine operator produces a signal on the master reset line 325, this signal being represented in FIG. 12 by the wave shape 326. At the end of this signal 326, the synchronizing circuit 294 is opened and the clock pulses emerge on line 295, the wave envelope of these pulses being shown in FIG. 12 by the wave trace 327. The pulses on the line 295 drive the timing counter 296 and its operation is shown in FIG. 12 by the plot 328. The signal on the reset line 325 is connected to the synchronizing circuit 305 where it simulates a strobe pulse on line 306 and hence starts the phase counting through eight phases as shown by the first true output 329 of the phase counter output representation 330. During this first set of eight phases, the control is driven through a data processing cycle with a clear signal input to all the storage registers to insure that the entire control is aligned with no stored data. The interpolaors and output accumulators are also cleared by the same clear sibnal 323 during the first data processing phase 329. The individual phase outputs, identified as P1–P8, are also shown in FIG. 12, these being the phase output signals on the set of lines 310 as described.

At some time after the reset signal 326 and after the initializing operation of the phase counter 303, the operator starts the reader 19 and the first line of the first block of tape 18 is advanced to the reading position at which time a strobe pulse 331, FIG. 12 is output over the line 306 to the synchronizing circuit 305 and the phase counter 303 is serially operated in time with the cycling of the timing counter 296 to produce the second series of eight true phase output signals P1–P8. During each of the eight phases, distinct data processing functions are performed, depending upon that portion of a block of tape which is read at any particular strobe or sprocket signal 331. If the tape is positioned so that the first line X, the X-axis address, is read, the time during the first phase is utilized to set an X-axis information preparatory flip-flop 332, FIG. 9, and for the parity check operation to be made.

There is also a preparatory flip-flop 333, 334, 342 for each of the Y and X-axes and the feed rate function, respectively. These preparatory flip-flops 332–334 are set during the last half of the first phase. During the first half of phase one, a sample pulse is connected over a line 335 from the decoder 299, FIG. 9, to a gate 336 and through it to a clock line 337 which causes any previously flip-flop to output a gate setting signal to the respective gates in the data processing circuits to transfer information to corresponding processing circuits, for example, the gates 56 and 57 are set when the output on line 338 is true. These three flip-flops 332–334 are initially cleared and are also cleared after each sampling pulse by recycling that pulse back to the respective flip-flop. The sampling gate 336 is conditioned to occur only when a letter address or an end of block signal occurs through operation of the decoder circuit 299 to which an address input and an end of block signal are applied over lines 341 and 344 as two of the information inputs thereto. Since the line X is the first to be read, no conditioning flip-flop has previously been set and therefore during its phase one, all that happens is that the flip-flop 332 is set to store an X-axis address. This is all that happens during the first eight phases to be counted, the other seven phases being counted out but producing no data processing. The tape reader is now automatically advanced one line after the eight phases to bring the first dimension digit line X1 to reading position and the strobe pulse 331 is repeated to again start the phase counter 303. Again during the first phase of the new phase series, parity is again checked as in the case of each line. If the line being read is a number as in this case, during the second phase the code converter portion of the circuit 19 is cycled once around to convert the digit to its pure binary form and retained in a register within the converter. The balance of the cycles time out. The lines X2 through X7 produce the same result in the control as did the line X1 and with each, the additional binary word information is stored in the converter to accumulate the full binary word corresponding to the coded decimal number represented by lines X1–X7 of the tape 18.

The next line to be read is an address line Y signifying a Y-axis address. This line causes the sampling pulse to line 335 which results in the X-axis information gates being opened to pass data to their respective data processing circuits. Following this the flip-flop 339 is set to store a Y-axis address and the parity checking is again repeated during phase one. Now during the following phase two, the X-axis number word in the code converter storage is shifted simultaneously to the X-axis previous point register 49 and to the subtractor circuit 76, FIG. 2. Since at this time, the first block is being read, the difference output over line 77 is the X-axis binary number word most recently read. This is so since the register 49 was reset to all "zeroes" before the tape 18 began to advance in the reader 19. However, in succeeding manipulations this binary word will represent the difference between the new dimension and a previously read dimension in the previous point register 49. The difference word issues as a serial output from the subtractor 76 and into the sign test register 78, FIG. 3, in phase two. The register 78 is a twenty-two bit register and therefore is filled by the first twenty-two pulses of phase two so that pulse twenty-three is used to clock the sign test flip-flop 85, this test signal being applied over the line 84. Now as phase three is counted, the information in the sign test register 78 is cycled out to the normalizing register 111–113 but only the register 111 is clocked due to the opening of the gate 101 and hence the difference is shifted only into the X-axis normalizing register 111. The balance of the four through eight phases are counted out but no additional processing occurs. The next seven lines Y1–Y7 are sequentially read and the binary number accumulated in the code converter.

When the tape 18 advances to position the line Z for reading, the line 335 transmits a sample pulse and a "true" output is applied on the line 339 to cause the Y-axis data processing gates to be opened and during phases two and three, the Y-axis difference is formed, the sign tested and the difference stored in the first phase. The next phase periods four through eight are counted out but again nothing happens during them. The lines Z1–Z7 are successively moved through the reader and each results in the eight phases but at each cycle of eight only the first two result in any processing, this being the same as at the times when lines X1–X7 and Y1–Y7 were read.

After the lines Z1–Z7 are read, the line F is moved into the reader and since there is a letter address in this line, the sample pulse is applied to the line 335, the flip-flop 334 outputs a signal on the line 340 and the Z-axis data processing gates are opened to direct the Z-axis information to and from the appropriate circuits in phase two and the Z-axis difference into the register 113 during phase three. During the next four of the eight-count phase cycles, the feed rate number represented by the lines F1–F4 is read and converted, the processing occurring during each first and second phase period only and the binary number word is retained in the converter.

Finally, the end of block signal line EB is moved to the reading position and sensed. During the first part of phase one of the phase cycle, the flip-flop 342, which was set when the line F was read, outputs a signal on the line 343 that causes the gates in the feed rate circuit to be set so that during phase two, the new feed rate binary number word is shifted into the storage register 202, FIG. 7. Nothing happens in phase three but when phases four and five occur, the normalizing process takes place in the registers 111, 112 and 113 of FIG. 3 as was described in connection with this portion of the data processing circuit. This operation is triggered by the end of block signal output on the line 344 and applied also as an input to the decoding network 299 where it effects the same action and outputs as the address signal on line 341 as well as to produce the normalizing process.

Also in phases six through eight of the end of block line phase cycle, the span compensation computing is performed. During phase six, the X-axis register 111 is sampled at its five most significant bits and the value is squared and transferred into the sum register 262, FIG. 8. During phase seven, the Y-axis register 112 is similarly sampled, the value squared, then the squared value is added to the contents of the register 262 and finally the new sum is stored there. During phase eight, the Z-axis register 113 is sampled, the value is squared, the squared value is added to the sum in the register 262 and the sum passed through the circuit 269 to form the register 254 where it is held until the next span signal at which time the gate 271 is opened to allow the compensation number to be shifted into the register 275, FIG. 7.

The processing cycle is finished with the computation for span length compensation and the processing circuits wait until a start new span signal is output from the interpolator gate 163, FIG. 4. When this signal occurs, the registers 111, 112, 113 are dumped into the interpolator registers 132, the feed rate number word is transferred to the register 207, FIG. 7 and the span compensation factor is transferred to the register 275. The reader is also pulsed by the start new span signal on line 128 to advance the next tape line after the end of block line EB and the data processing manipulations are begun again and continue in the manner described until the next end of block signal. The interpolators 22, 23, 24 and output accumulators 25, 26, 27 are constantly driven by the discrete and cyclic pulse trains provided from the feed rate control circuits that gate discrete pulse trains provided by the counting circuit 296 and decoding circuit 299 at a rate that is independent of the operation of the phase counter 303. The sampling of the output accumulators must only be timed with the cycling therein and therefore can be timed by the outputs from the counter 296 although the frequency is independent of the cycling frequency of the counter 296.

What is claimed is:

1. An apparatus for the generation of a command signal to operate a servo mechanism controlling movement of a movable member, the apparatus comprising in combination:
   (a) means for supplying a difference number word representing the dimensional space between two points along a predetermined path,
   (b) means for producing a sign signal indicating the direction of said difference along the predetermined path,
   (c) means for normalizing said difference number word to change the modulus thereof and to eliminate leading zeros until a binary "one" appears in the most significant digit place,
   (d) means for adding said normalized difference number word iteratively the modulus number of times,
   (e) means for algebraically accumulating overflows from said iterative addition means in accordance with the sign signal to generate a number word progressing across the dimensional space between said two points on the predetermined path, and
   (f) means for periodically sampling said generated number word and producing a command signal input to the servo mechanism directly proportional to the generated number word when sampled.

2. The apparatus of claim 1 wherein:
   (a) the means for adding said normalized difference number is a pulse operated circuit requiring a discrete train of a predetermined number of pulses to perform each additive iteration, and
   (b) means are provided for delivering said discrete trains to said means for adding said normalized numbers at a variable rate with respect to time to vary the rate of said overflow accumulation.

3. The apparatus of claim 2 wherein:
   (a) means are included for establishing two rates for delivery of said discrete trains, and
   (b) means are also provided for gradually changing the rate of delivery from one of said two rates to the other thereof.

4. The apparatus of claim 2 wherein:
   (a) a master oscillator is provided to supply the pulses of said discrete trains,
   (b) a voltage controlled oscillator is provided to produce an output train of control pulses at a rate less than the frequency of said master oscillator, and
   (c) said means for delivering the discrete trains operates to deliver said discrete trains at a rate directly proportional to the rate of said control pulses.

5. The apparatus of claim 4 wherein:
   (a) a voltage divider is connected to said controlled oscillator to provide a rate control signal by which the rate of control pulses is changed, and
   (b) means are provided for adjusting said voltage divider to change the rate of said control pulses.

6. An automatic apparatus for the control of movement of a movable member in response to numerical data furnished by a reading and translating unit in the form of a series of number words representing spaced points progressing along a path of movement, the apparatus comprising in combination:
   (a) means for producing a difference number word representing the magnitude of difference between successive points along the path of movement,
   (b) means for determining the sign of said difference number word in accordance with the direction from the preceding point to the succeeding point of said successive points,
   (c) means for normalizing said difference number word to change the modulus thereof to eliminate leading zeros until a binary "one" appears in the most significant digit place,
   (d) means for adding said normalized difference number word iteratively the modulus number of times,
   (e) means for algebraically accumulating overflows from said iterative addition means in accordance with the sign of said difference number word to generate a number word progressing from a value corresponding to the preceding point to a value corresponding to the succeeding point, and (f) means for driving said movable member along said path of movement in response to said generated number word.

7. An automatic apparatus for the control of movement of a movable member in response to numerical data furnished by a reading and translating unit in the form of a series of number words representing spaced points progressing along a path of movement, the apparatus comprising in combination:

(a) means for interpolating between successive ones of said number words to generate a dynamic number word changing from a value corresponding to the preceding number word to a value corresponding to the next succeeding number word, (b) means for driving said movable member along said path of movement at a rate dependent upon the rate of change of said dynamic number word, and (c) means for driving said means for interpolating in response to a series of discrete pulse trains to change said dynamic number word by single increments, occurring at a rate dependent upon the repetition rate of said discrete pulse trains and including (1) a master oscillator having an output train of pulses occurring at a high frequency, (2) a voltage controlled oscillator having an output train of gate pulses occurring at a rate less than said master oscillator train of pulses, and (3) means for connecting a predetermined number of said master oscillator pulses repetitively to said means for interpolating to form said discrete pulse trains and at a repetition rate in direct proportion to the rate of said gate pulses.

8. An automatic apparatus for control of movement of a movable member in response to numerical data furnished by a reading and translating unit in the form of a series of difference number words representing the dimensional space between two points along a predetermined path of movement, the apparatus comprising in combination:

(a) means for interpolating over the value of said difference number word to generate a dynamic number word incrementally progressing across the dimensional space between said two points on the predetermined path, (b) means for driving said means for interpolating in response to a series of discrete pulse trains to change said dynamic number word by increments occurring at a rate dependent upon the repetition rate of said discrete pulse trains, (c) means for storing a controlling rate symbol in the form of a number word representing a time rate of change of said dynamic number word, and (d) means for connecting a series of discrete pulse trains to said means for interpolating at a repetition rate dependent upon said controlling rate symbol, said means including (1) means for iteratively adding said controlling rate symbol to produce a series of carry output signals, and (2) means for producing the series of discrete pulse trains at a frequency of repetition directly proportional to the series of carry output signals.

9. The apparatus of claim 8 wherein:

(a) means are provided for supplying a new rate symbol in the form of a number word, and (b) means are provided to incrementally change said controlling rate symbol at a predetermined rate to correspond to said new rate symbol to gradually change the rate of occurrence of said output carry signals.

10. An automatic apparatus for control of movement of a movable member in response to numerical data furnished by reading and translating unit in the form of a series of difference numer words representing the dimensional space between two points along a predetermined path of movement, the apparatus comprising in combination:

(a) means for interpolating over the value of said difference number word to generate a dynamic number word incrementally progressing across the dimensional space between said two points on the predetermined path, (b) means for driving said means for interpolating in response to a series of discrete pulse trains to change said dynamic number word by increments occurring at a rate dependent upon the repetition rate of said discrete pulse trains, (c) means for storing a controlling rate symbol in the form of a number word representing a time rate of change of said dynamic number word, and (d) means for connecting a series of discrete pulse trains to said means for interpolating at a repetition rate dependent upon said controlling rate symbol, and further including (1) means for storing a new rate symbol in the form of a number word representing a second time rate of change of said dynamic number word, (2) means for comparing said controlling and new rate symbols to determine the existence and direction of a difference therebetween, and (3) means for incrementally changing said controlling rate symbol in response to a difference and direction thereof determined by said means for comparing until said controlling and new rate symbols are equal.

11. The apparatus of claim 10 wherein:

(a) means are provided for regulating the rate of incremental change of said controlling rate symbol to provide predetermined uniform acceleration and deceleration of said means for interpolating.

12. The apparatus of claim 11 wherein:

(a) said means for incrementally changing is an algebraic summing circuit, (b) means are provided for cyclically connecting said controlling rate symbol as an input to said summing circuit, and (c) said means for regulating the rate of incremental change presets a single increment in said summing circuit for algebraic summing with said controlling rate signal in accordance with the direction of difference between said controlling and new rate symbols in predetermined cycles of said controlling rate symbol through said summing circuit.

13. In an automatic control apparatus having an interpolator for generating a series of closely spaced points progressing from one point to another of a series of widely spaced points, an interpolation rate control apparatus comprising in combination:

(a) means for storing two rate control signals having a difference therebetween, (b) means for comparing said rate control signals to produce a sign output signal corresponding to the direction of magnitude from one of said signals to the other thereof, (c) means for combining fixed increments to the one rate control signal at a predetermined rate and in a sense dependent upon said sign output signal to progressively change the magnitude of said one rate control signal toward the magnitude of the other of said rate control signals, and (d) means for driving the interpolator at a rate directly proportional to the magnitude of said one rate control signal whereby said rate is accelerated and decelerated in time with the change in magnitude thereof and in accordance with the direction of said change in magnitude.

14. In an automatic control apparatus for generating a series of closely spaced points in digital form progressing from one to the other of successive points in a series of widely spaced points represented in digital form, the combination comprising:
(a) means for providing a difference number word having a magnitude equal to the difference between said one and other successive points, said number word having a predetermined modulus,
(b) means for iteratively adding said difference number word the predetermined modulus number of times and for producing overflow signals from said iterative adding,
(c) means for sensing the direction from said one to the other of the successive points and for producing a sign signal corresponding thereto, and
(d) means for combining said overflow signals and said one successive point number word in accordance with said sign signal to effect a progressive change of said one successive point number word into said other successive point number word.

15. The apparatus of claim 14 wherein said means for iteratively adding includes:
(a) a serial adding circuit,
(b) a register connected to receive and store therein a partial sum output of said adding circuit, and
(c) means cyclically and simultaneously for applying said difference number word and the partial sum contents of said register as serial inputs to said adding circuit to produce an iterative addition of said difference number word, said adding circuit producing overflow signals for each serial addition resulting in a partial sum number word greater than the capacity of said register.

16. An automatic apparatus for the coordinated control of movement of a plurality of movable members in response to numerical data furnished by a reading and translating unit, said data presented in the form of a series of binary number words cyclically representing spaced points along a plurality of coordinate axes defining a predetermined path of movement of a point with respect to the origin of the plurality of axes, the apparatus comprising in combination:
(a) means for producing a set of binary number difference words representing the magnitudes of the differences between successive points along each of the coordinate axes,
(b) means for determining the sign of each of said difference words in accordance with the direction from the preceding points to the succeeding points along the respective axes,
(c) means for normalizing said difference number words simultaneously to change the modulus of each to eliminate leading zeros in the most significant digit places until the largest of said difference number words has a binary "one" in the most significant digit place,
(d) means for adding each of said normalized difference number words iteratively and simultaneously the modulus number of times to produce a series of overflow signals,
(e) means for algebraically accumulating the respective overflow signals from said iterative adding means in accordance with the signs of the respective numbers to generate a set of binary number words incrementally progressing from values corresponding to the preceding points along the respective axes to a value corresponding to the succeeding points, and
(f) means for driving each of said movable members along the respective axis of movement thereof in response to said generated binary number word corresponding thereto.

17. The apparatus of claim 16 wherein:
(a) said means for producing sets of binary number difference words produces one of said difference number words in the complementary form of another thereof when said one and the other binary number difference words are of opposite sign,
(b) said means for determining the sign produces a sign signal output corresponding to each of said binary number difference words, and
(c) means are provided for complementing said one difference number word in response to the sign signal output corresponding thereto to place said binary number difference words in the same form.

18. The apparatus of claim 16 wherein said means for adding includes a plurality of circuits corresponding to the respective axes, each of said circuits including:
(a) a serial binary adding circuit,
(b) a register connected to receive and store therein a partial sum output of said adding circuit, and
(c) means for applying the respective binary number difference word and the partial sum contents of said register cyclically and simultaneously as serial inputs to said adding circuit, said adding circuit producing the overflow signals for each serial addition wherein there is produced a partial sum binary number word greater than the capacity of said register.

19. The apparatus of claim 18 wherein:
(a) said means for applying the respective binary number difference word is pulse operated and effects a complete cycle of the respective binary number difference word and partial sum content in response to a discrete train of pulses, and
(b) means are provided for delivering said discrete trains to said means for applying the respective binary number difference word in each of said plurality of circuits at a variable rate with respect to time to vary the rate of accumulation of the respective overflows.

20. The apparatus of claim 19 wherein:
(a) means are provided for establishing two rates for delivery of said discrete trains, and
(b) means are provided for gradually changing the rate of delivery from one of said two rates to the other thereof.

21. An automatic apparatus for control of movement of a plurality of movable members in response to numerical data furnished by a reading and translating unit in the form of a series of number words cyclically representing coordinate dimensions of spaced points progressing along a predetermined path of movement, the apparatus comprising in combination:
(a) means for interpolating between successive number words representing dimensions in each coordinate direction to generate dynamic number words each incrementally progressing across dimensional space in its respective coordinate direction such that the magnitude of the dynamic number word is an absolute representation of its total progression,
(b) means for storing a controlling rate symbol in the form of a feedrate number word representing the resultant time rate of change of movement along said predetermined path,
(c) means for generating the magnitude of a displacement vector (as determined by a particular set of coordinate dimensions), in the form a span length number word,
(d) means for digitally relating the span length number word to the controlling rate symbol to create a series of discrete pulse trains, and
(e) means for driving said means for interpolating in response to the series of discrete pulse trains to change said dynamic number words by increments occurring at a rate dependent upon the repetition rate of said discrete pulse trains.

22. The apparatus of claim 21 wherein:
(a) a master oscillator is provided to supply the pulses of said discrete trains, (b) a voltage controlled oscillator is provided to produce an output train of control pulses, (c) means are provided for computing the resultant length of movement between spaced points along said predetermined path represented by the differences between the preceding and next succeeding ones of the successive number words in the respective coordinate directions, and (d) means are provided for operating said means for connecting a series of discrete pulse trains to connect trains of pulses of predetermined number length from said master oscillator to said means for interpolating at a repetition rate directly proportional to the rate of said control pulses and said controlling rate symbol and inversely proportional to said resultant length of movement.

23. The apparatus of claim 22 wherein:

(a) a voltage divider is connected to said controlled oscillator to provide a rate control signal by which the rate of control pulses is changed, and (b) means are provided for adjusting said voltage divider to change the rate of said control pulses.

24. The apparatus of claim 21 wherein:

(a) means are provided for computing the resultant length of movement along said predetermined path as represented by the differences between the preceding and next succeeding ones of the successive number words in the respective coordinate directions, and (b) means are provided for operating said means for connecting a series of discrete pulse trains at a rate directly proportional to said rate controlling symbol and inversely proportional to said resultant length of movement.

25. The apparatus of claim 21 wherein:

(a) means are included for storing a new rate symbol in the form of a number word representing a second time rate of change of said dynamic number word, (b) means are provided for comparing said controlling and new rate symbols to determine the existence and direction of difference therebetween, and (c) means are provided for incrementally changing said controlling rate symbol in response to the difference and direction thereof at a predetermined rate until said controlling and new rate symbols are equal whereby said means for interpolating is accelerated and decelerated.

26. An automatic apparatus for control of movement of a plurality of movable members in response to numerical data furnished by a reading and translating unit in the form of a series of number words representing coordinate dimensions of spaced points progressing along a predetermined path of movement, the apparatus comprising in combination:

(a) means for interpolating between successive number words representing dimensions in each coordinate direction to generate dynamic number words each incrementally changing in value from the preceding to the next succeeding of the successive number words in the respective coordinate direction, (b) means for driving said means for interpolating in response to a series of discrete pulse trains to change said dynamic number words by increments occurring at a rate dependent upon the repetition rate of said discrete pulse trains, (c) means for computing the resultant length of movement between spaced points along said predetermined path represented by the differences between the preceding and next succeeding ones of the successive number words in the respective coordinate directions, and (d) means for connecting a series of discrete pulse trains to said means for interpolating at a repetition rate inversely proportional to said resultant length of movement whereby said means for interpolating is automatically adjusted to change the rate of generation of the dynamic number words to tend to move a coordinate point defined thereby along said predetermined path at a constant rate.

27. An automatic apparatus for the control of a movable member in response to numerical data furnished by a reading and translating unit in the form of a series of binary number words representing spaced points progressing along a path of movement, the apparatus comprising in combination:

(a) means for producing a binary number difference word $dx$ representing the magnitude of difference between the successive points along the path of movement, (b) means for determining the sign of said difference binary number word in accordance with the direction from the preceding point to the succeeding point of said successive points, (c) means for normalizing said difference number word to reduce the modulus thereof to a value $m$ by eliminating leading zeros until a binary one appears in the most significant digit place, (d) means for generating a binary number word $X_i$ progressing from a value corresponding to the preceding point $X_0$ to a value corresponding to the succeeding point in accordance with the expression $$X_i = X_0 + \sum_0^m (dx)$$

wherein $X_0$ is a whole number and $dx$ is a fraction.

28. In an apparatus for operating a servo mechanism to control the position of the movable member driven thereby, the combination comprising:

(a) means for generating a control signal to continuously operate said servo mechanism, (b) means for producing a rate signal, (c) means for controlling said means for generating in accordance with said rate signal, (d) means for incrementally changing the rate signal to the next succeeding value in response to acceleration and deceleration signals, (e) means for selectively setting said acceleration and deceleration signals (f) means for selectively reducing and restoring the magnitude of said rate signal and consequently changing said means for controlling, and (g) means for changing said acceleration and deceleration signals by an amount proportional to the magnitude of change of the rate signal.

References Cited

UNITED STATES PATENTS

| | | | |
|---|---|---|---|
| 3,122,691 | 2/1964 | Centner | 318—20.110 |
| 3,002,115 | 9/1961 | Johnson | 318—20.110 |
| 3,328,655 | 6/1967 | Tripp | 235—151.11 X |
| 3,270,186 | 8/1966 | Centner | 235—151.11 |
| 3,320,409 | 5/1967 | Larrowe | 235—151 |

MALCOLM A. MORRISON, Primary Examiner

EDWARD J. WISE, Assistant Examiner

U.S. Cl. X.R.

235—151, 151.1; 318—18